US010690072B2

(12) United States Patent
Jammoussi et al.

(10) Patent No.: US 10,690,072 B2
(45) Date of Patent: Jun. 23, 2020

(54) METHOD AND SYSTEM FOR CATALYTIC CONVERSION

(71) Applicant: Ford Global Technologies, LLC, Dearborn, MI (US)

(72) Inventors: Hassene Jammoussi, Canton, MI (US); Imad Hassan Makki, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 531 days.

(21) Appl. No.: 15/298,164

(22) Filed: Oct. 19, 2016

(65) Prior Publication Data

US 2018/0106205 A1    Apr. 19, 2018

(51) Int. Cl.
*F02D 41/02* (2006.01)
*F01N 13/08* (2010.01)
*F01N 3/10* (2006.01)
*F01N 3/28* (2006.01)
*F02D 41/14* (2006.01)
(Continued)

(52) U.S. Cl.
CPC ............ *F02D 41/024* (2013.01); *F01N 3/101* (2013.01); *F01N 3/2882* (2013.01); *F01N 9/00* (2013.01); *F01N 13/011* (2014.06); *F01N 13/08* (2013.01); *F01N 13/107* (2013.01); *F02D 41/1454* (2013.01); *F02D 41/26* (2013.01); *F01N 2240/26* (2013.01); *F01N 2410/00* (2013.01); *F01N 2560/025* (2013.01); *F01N 2610/03* (2013.01); *F01N 2900/0416* (2013.01); *F01N 2900/1402* (2013.01); *F01N 2900/1602* (2013.01); *F02D 41/1475* (2013.01); *F02D 41/1495* (2013.01); *Y02T 10/22* (2013.01); *Y02T 10/47* (2013.01)

(58) Field of Classification Search
CPC ............ F02D 41/1454; F02D 41/1495; F01N 13/011; F01N 13/08; F01N 13/107; F01N 2410/00; F01N 2560/025; F01N 2900/1602
USPC ................................... 701/103; 60/274, 281
See application file for complete search history.

(56) References Cited

U.S. PATENT DOCUMENTS 3,645,098 A * 2/1972 Templin ............... F01N 3/0814
123/568.11
5,142,864 A * 9/1992 Dunne ............... B01D 53/9481
422/169
(Continued)

FOREIGN PATENT DOCUMENTS

CN    103711551 B  *  4/2014
CN    103711553 A  *  4/2014
(Continued)

*Primary Examiner* — John M Zaleskas
(74) *Attorney, Agent, or Firm* — Geoffrey Brumbaugh McCoy Russell LLP

(57) ABSTRACT

Methods and systems are provided for regulating exhaust flow through an exhaust system of an engine. In one example, a method may include directing exhaust from downstream of a catalytic converter to a compressor storage tank in response to an engine air-fuel ratio deviating from stoichiometry. The stored exhaust may be released from the compressor storage tank to recirculate through the catalytic converter to atmosphere after adjusting an air-fuel ratio of the exhaust in the storage tank and when the catalytic converter is at a target operating temperature.

19 Claims, 9 Drawing Sheets

(51) Int. Cl.
*F02D 41/26* (2006.01)
*F01N 13/00* (2010.01)
*F01N 13/10* (2010.01)
*F01N 9/00* (2006.01)

(56) References Cited

U.S. PATENT DOCUMENTS

| | | | | |
|---|---|---|---|---|
| 5,307,627 A | * | 5/1994 | Christensen | F01N 3/0835 422/169 |
| 5,357,791 A | * | 10/1994 | Gee | F02D 41/1441 73/114.72 |
| 5,634,332 A | * | 6/1997 | Tanaka | B01D 53/9445 60/284 |
| 5,647,206 A | * | 7/1997 | Yamamoto | F01N 3/0814 60/297 |
| 5,738,832 A | | 4/1998 | Dogahara et al. | |
| 6,067,605 A | | 5/2000 | Koyama et al. | |
| 6,250,073 B1 | * | 6/2001 | Zimmer | F01N 3/18 180/165 |
| 7,681,560 B2 | | 3/2010 | Yamaoka et al. | |
| 2003/0233825 A1 | * | 12/2003 | Asanuma | F01N 3/20 60/278 |
| 2004/0226289 A1 | * | 11/2004 | Hagerty | F01N 1/089 60/297 |
| 2007/0089715 A1 | * | 4/2007 | Kolavennu | F02B 37/02 123/568.11 |
| 2009/0032000 A1 | * | 2/2009 | Rim | F01N 5/02 123/568.12 |
| 2009/0120061 A1 | * | 5/2009 | Elwart | F01N 5/02 60/274 |
| 2009/0120063 A1 | * | 5/2009 | Uhrich | F01N 3/2832 60/278 |
| 2009/0120064 A1 | * | 5/2009 | Uhrich | F01N 3/2846 60/278 |
| 2009/0120065 A1 | * | 5/2009 | Uhrich | F02D 41/0025 60/284 |
| 2009/0120067 A1 | * | 5/2009 | Elwart | F01N 5/02 60/285 |
| 2009/0120071 A1 | * | 5/2009 | Gandhi | F02D 41/0025 60/287 |
| 2010/0024396 A1 | * | 2/2010 | Lupescu | F01N 3/0807 60/284 |
| 2010/0205939 A1 | * | 8/2010 | Sano | F01N 3/0238 60/276 |
| 2010/0223921 A1 | * | 9/2010 | Uhrich | F01N 3/0807 60/311 |
| 2010/0313858 A1 | * | 12/2010 | Springer | F01N 3/0807 123/568.11 |
| 2012/0137659 A1 | * | 6/2012 | Uhrich | F01N 3/2832 60/274 |
| 2012/0204544 A1 | * | 8/2012 | Uhrich | F01N 3/0807 60/274 |
| 2013/0305714 A1 | * | 11/2013 | Rollinger | F02D 23/02 60/603 |
| 2014/0261342 A1 | * | 9/2014 | Kolhouse | F02M 26/37 123/568.11 |
| 2015/0219033 A1 | * | 8/2015 | Jammoussi | F02D 41/1454 701/104 |
| 2017/0335748 A1 | * | 11/2017 | Zhang | F02M 26/05 |
| 2017/0335805 A1 | * | 11/2017 | Zhang | F01P 3/20 |
| 2018/0003116 A1 | * | 1/2018 | Fersman | F02D 41/0235 |

FOREIGN PATENT DOCUMENTS

| | | | | |
|---|---|---|---|---|
| CN | 103835788 B | * | 6/2014 | |
| CN | 103835793 A | * | 6/2014 | F01N 11/007 |
| CN | 104265423 B | * | 1/2015 | |
| DE | 4342296 C1 | * | 11/1994 | B01D 53/9495 |
| DE | 102012005987 A1 | * | 9/2012 | F01N 5/02 |
| EP | 0967378 A2 | * | 12/1999 | F01N 11/007 |
| FR | 2956434 A1 | * | 8/2011 | F01N 3/2006 |
| GB | 1349051 A | * | 3/1974 | F01N 3/18 |
| JP | 2002070539 A | * | 3/2002 | F02M 26/15 |
| JP | 2004132247 A | * | 4/2004 | F01N 3/2006 |
| JP | 2009250086 A | * | 10/2009 | |

* cited by examiner

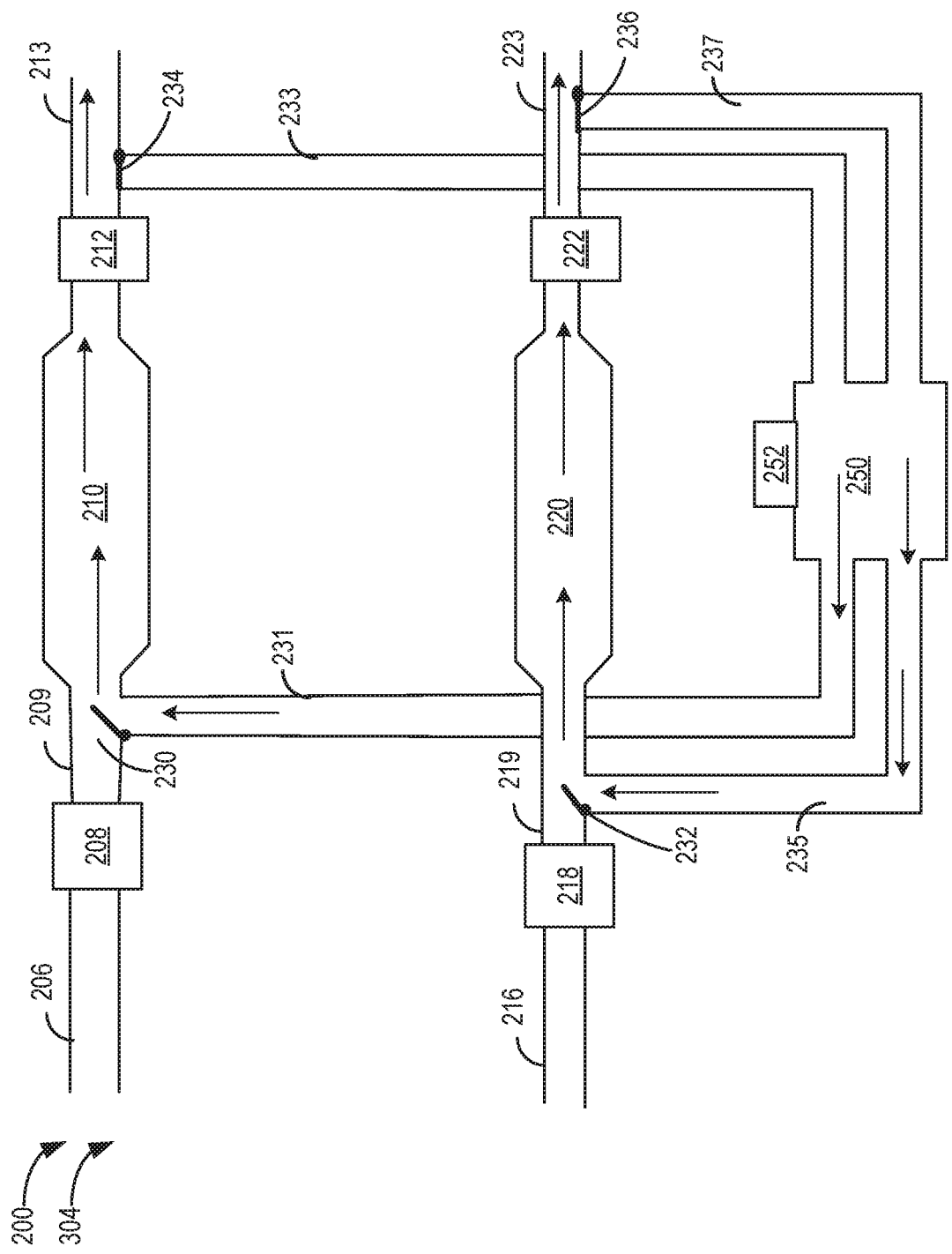

METHOD AND SYSTEM FOR CATALYTIC CONVERSION

FIELD

The present description relates generally to methods and systems for efficient and robust catalytic conversion in an engine of a vehicle.

BACKGROUND/SUMMARY

Catalytic converters may be present in the exhaust stream of motor vehicles in order to reduce the emission of pollutants produced during combustion. For example, unburnt fuel and carbon monoxide (CO) present in the exhaust released by an internal combustion engine may be converted to less toxic substances, such as carbon dioxide and water, by the catalytic converter before being released to the atmosphere. The catalytic converters function efficiently and optimally at a certain operating temperature. The catalytic converters do not each the operating temperature (also known as a light-off temperature) immediately after the start of the internal-combustion engine, and hence, the internal-combustion engine exhaust may be released into the environment without complete conversion of the unburnt hydrocarbons, thereby degrading emissions.

Other attempts to address the problem of emission degradation during cold start of an engine due to low catalytic converter temperature include storing the exhaust in a tank until the catalytic converter reaches the light-off temperature after which the stored exhaust may be directed through the catalytic converter and released to atmosphere, as shown in U.S. Pat. No. 6,250,073.

The inventors herein have recognized an issue with the above approach. In addition to being operated at or above light-off temperature, catalytic converters also achieve optimal conversion rates when the air-fuel ratio of exhaust entering the catalytic converter is controlled to a certain air-fuel ratio, such as stoichiometry. Further, besides cold start conditions, the exhaust gas will have a high load of unburnt hydrocarbons during other engine operating conditions, such as during a transient boost demand. The engine may be operated with richer fuel to meet the transient boost demand, for example, during acceleration, which deviates the air fuel ratio from stoichiometry, resulting in degradation of emissions even though the catalytic converter is at the target operating temperature.

In one example, the issues described above may be addressed by a method for operating an exhaust system of an engine, including directing a flow of exhaust gas from downstream of a catalytic converter to a tank in response to engine air-fuel ratio deviating from a threshold air-fuel ratio, adjusting an air-fuel ratio of the exhaust gas in the tank, and selectively releasing the exhaust gas from the tank to upstream of the catalytic converter, the released exhaust gas adjusted to the threshold air-fuel ratio.

In one example, directing exhaust flow from downstream of the catalytic converter to the tank may be performed in response to an air fuel ratio of the tank being off-stoichiometry. In a further example, directing exhaust flow from downstream of the catalytic converter to the tank may be performed in response to a degraded oxygen sensor upstream of the catalytic converter. In another example, directing exhaust flow from downstream of the catalytic converter to the tank may be performed in response to a temperature of the catalytic converter being below a threshold temperature. The releasing of exhaust from the tank may be performed in response to a pressure inside the tank being more than a minimum pressure in combination with the temperature of the catalytic converter being more than the threshold temperature and an exhaust air-fuel ratio stored in the tank being stoichiometric.

In this way, exhaust may be stored in a tank coupled to a catalytic converter both during cold start conditions and during conditions where an air fuel ratio of the engine is off-stoichiometry. The stored exhaust gas may be re-circulated back through the catalytic converter when the catalytic converter is capable of efficiently breaking down the hydrocarbons in the exhaust gas before being released to atmosphere, thus reducing degradation of tail pipe emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3C shows an exhaust release mode of operation of the exhaust system of FIG. 2.

DETAILED DESCRIPTION

Figure 1:
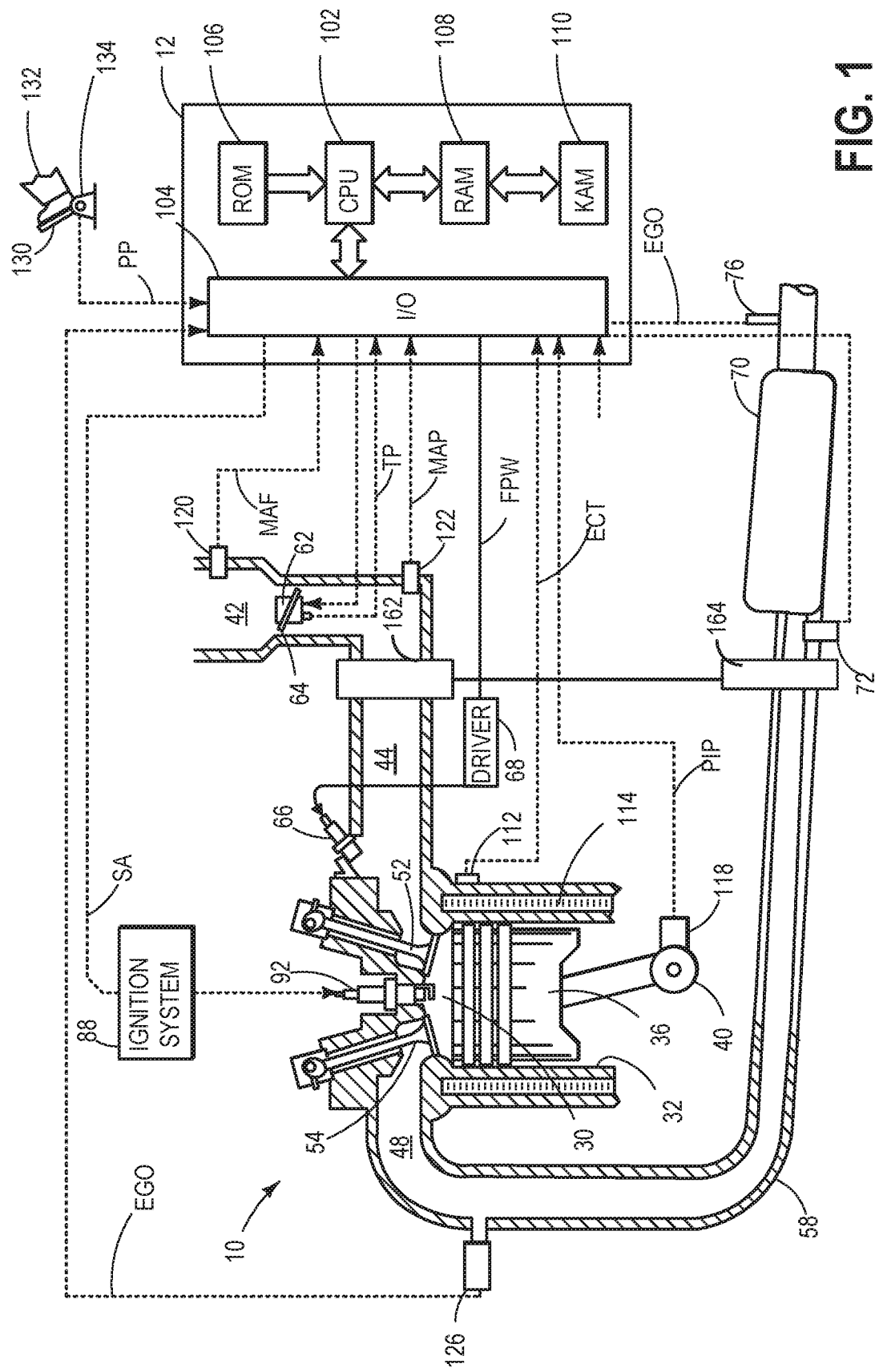
FIG. 1 shows a schematic diagram of an example cylinder of a multi-cylinder engine with an emission control device coupled to an engine exhaust system.
Figure 2:
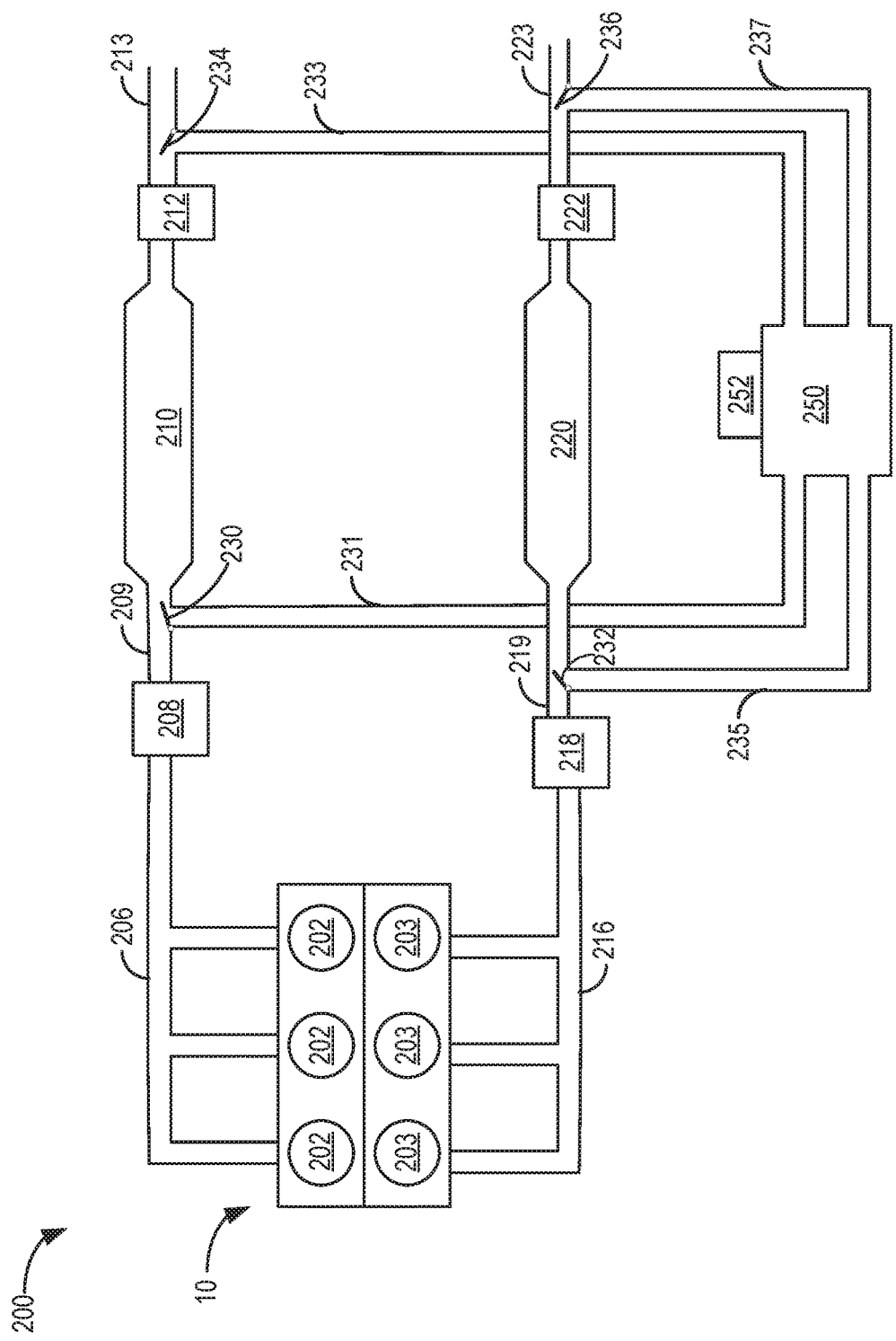
FIG. 2 illustrates an exhaust system of an engine.
Figure 3A:
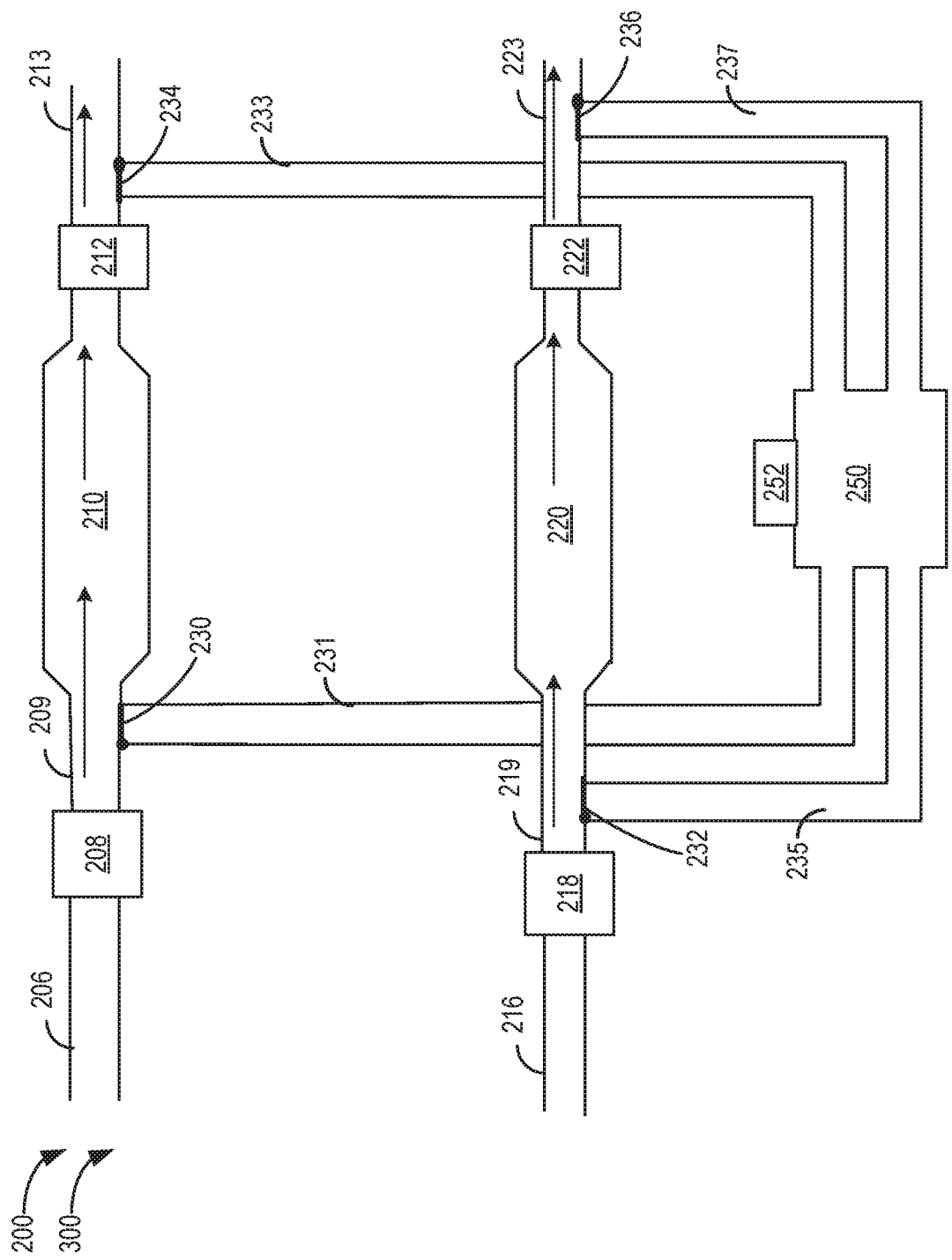
FIG. 3A shows a normal mode of operation of the exhaust system of FIG. 2.
Figure 3B:
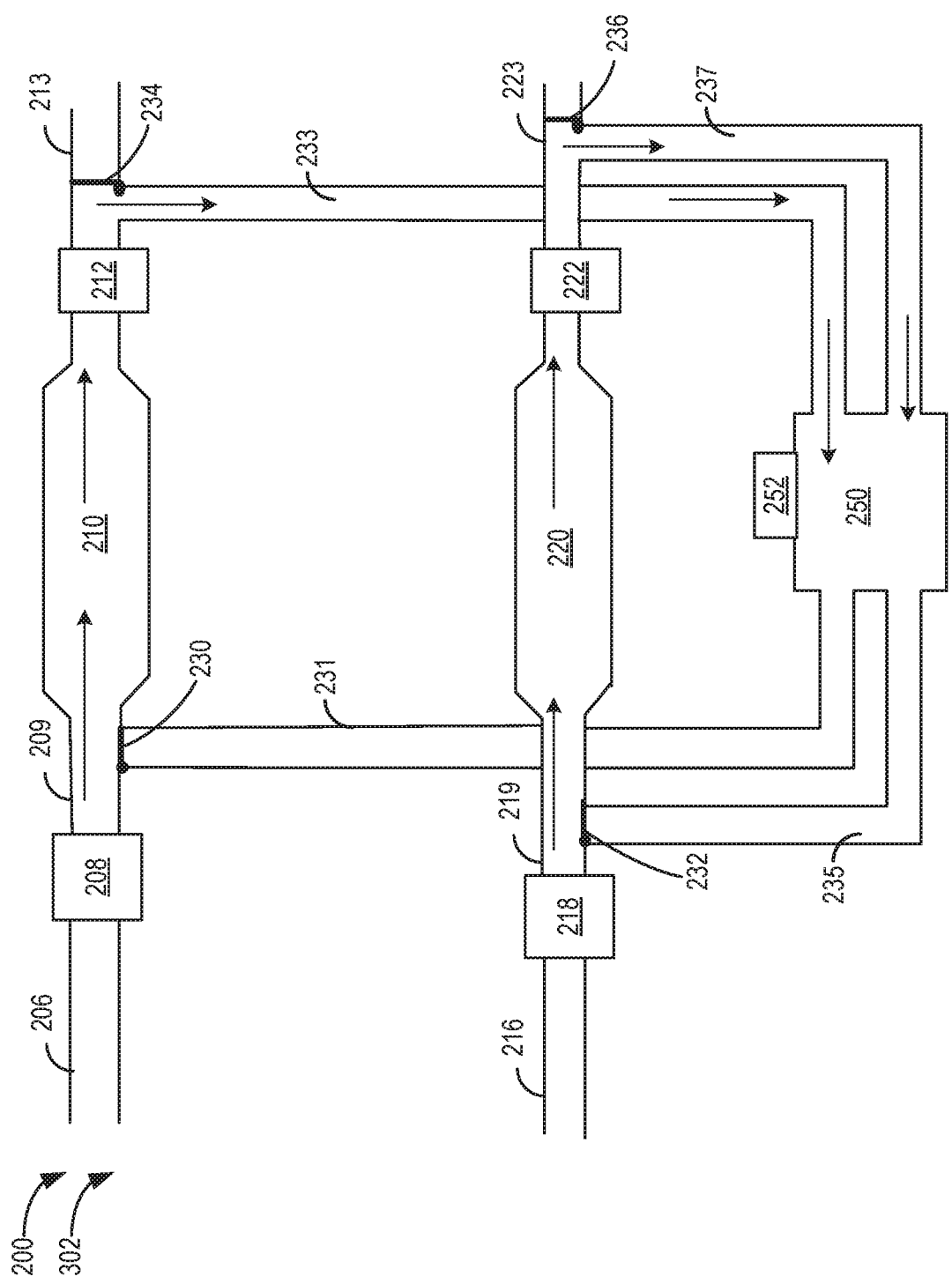
FIG. 3B shows an exhaust storage mode of operation of the exhaust system of FIG. 2.

Methods and systems are provided for directing exhaust along an exhaust system of an engine, such as the engine illustrated in FIG. 1. Exhaust generated during fuel combustion by the engine cylinders may flow through one or more emission control devices, such as catalytic converters, before being released to atmosphere. The catalytic converters when at a target operating temperature may oxidize and breakdown hydrocarbons in the exhaust before the exhaust flows to atmosphere. However, in certain engine operating conditions, the exhaust from the engine may flow through the catalytic converters and may then be directed for storage in a tank, instead of being directed for release to atmosphere. FIG. 2 illustrates an exhaust system of a six-cylinder engine, wherein exhaust from each bank of cylinders may flow through a catalytic converter to atmosphere or to a tank for storage. The exhaust may be released from the tank at a later point of time, for example, when the catalytic converter is at a light-off temperature, when the engine load is below a threshold, etc. FIGS. 3A-3C illustrate three different modes of operation of the exhaust system of FIG. 2, wherein the position of valves upstream and downstream of the catalytic converters is regulated by a controller responsive to certain engine operating parameters. Methods illustrated in FIGS.

Figure 6:
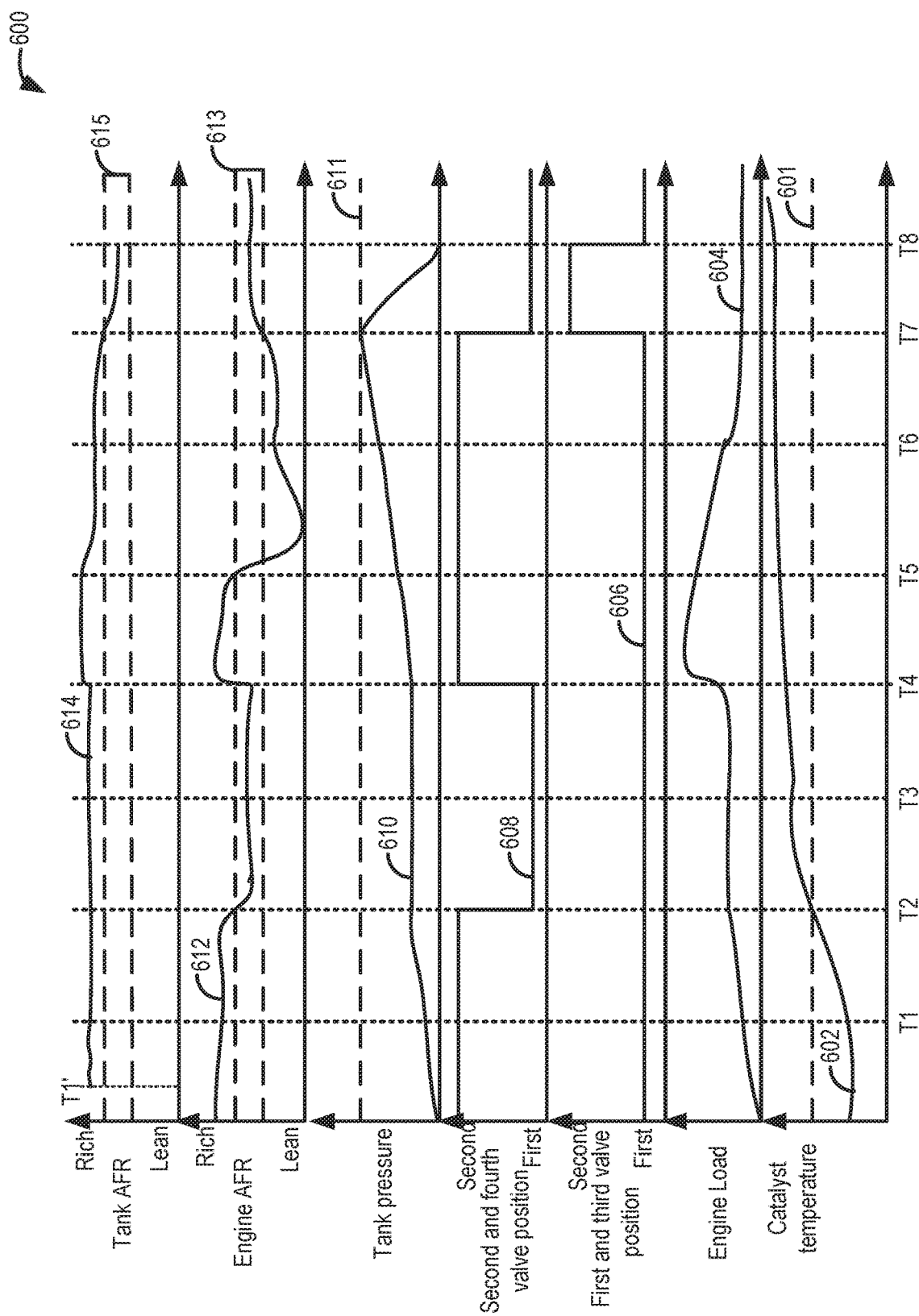
FIG. 6 illustrates an example operation map showing exhaust flow during various engine operating conditions.

4A-5 show operation of the exhaust system during various engine operating conditions, including during engine cold start, during transient boost demand, during an engine air-fuel ratio being off-stoichiometry, etc. FIG. 6 shows an example of an operational map while operating the exhaust system of FIG. 2.

FIGS. 1-3C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Exhaust generated by an internal combustion engine may flow through a plurality of emission control devices before being released to atmosphere. The plurality of emission control devices may include one or more catalytic converters, such as a three-way catalytic converter. Constituents of exhaust flowing through the catalytic converter may be oxidized and/or reduced and released to atmosphere. However, during certain engine operating conditions, for example, when the catalytic converter is not at a light-off temperature (at cold start conditions), when an engine air-fuel ratio (AFR) is not within a stoichiometric range (AFR is rich or lean), or when a sensor upstream of the catalytic converter is faulty, exhaust may be directed from downstream of the catalytic converter to a tank for storage instead of being released to atmosphere. When the engine operating conditions are ideal for release of the stored exhaust from the tank, for example, when the catalytic temperature is at the light-off temperature, and/or when the tank AFR is stoichiometric, etc., exhaust is directed from the tank to flow through the catalytic converters to atmosphere. Positions of valves upstream and downstream of the catalytic converter may be modulated to regulate exhaust flow either to atmosphere or to the storage tank.

The storage of the exhaust may additionally be applied when there is a transient boost demand. For example, during acceleration, the engine may be operated with a rich air-fuel mixture to increase the boost performance. AFR deviations may increase emissions even when the catalytic converter is at the target operating temperature, as the exhaust may include a higher load of hydrocarbons from unburnt fuel. The exhaust may be directed to the tank to hold the exhaust while the boost demand is met. In another example, exhaust may be directed for storage in the tank to bring the stored exhaust inside the tank to a stoichiometric state by either letting in richer exhaust or leaner exhaust based on measurement from an oxygen sensor downstream the catalytic converter, for example. By mixing lean exhaust stored in the tank with rich exhaust directed for storage in the tank, it is possible to bring exhaust stored in the tank to a stoichiometric condition, and then the exhaust may be released through the catalytic converter to atmosphere without degrading emissions. In this way, the storage tank may act as a filtering component. In one example, compressed exhaust stored in the tank may be used for performing other functions of the vehicle, for example, for inflating tires of the vehicle.

In a further example, exhaust may be directed for storage in the tank during an oxygen sensor fault condition. For example, when a symmetric filter fault is present in an oxygen sensor upstream of the catalytic converter, the oxygen sensor measurement will be more sluggish than normal, resulting in deviation of the AFR from stoichiometry. Hence, constituents of exhaust entering the catalytic converter may fall outside the optimal range of the catalytic converter. A high load of NOx may be present in the exhaust during lean AFR deviations, while a high load of CO may be present during rich AFR deviations. By directing exhaust with high NOx to the tank as well as directing exhaust with high CO to the tank, mixing of the two species of exhaust for a certain time in the tank may result in a stoichiometric or near stoichiometric mix inside the tank that may be released from the tank and then recirculated through the catalytic converter and released to atmosphere.

Turning to FIG. 1, a schematic diagram showing one cylinder of a multi-cylinder engine 10, which may be included in a propulsion system of a vehicle, is shown. In one example, the engine 10 may be a six-cylinder engine, wherein three cylinders may form a first bank of cylinders and another three cylinders may from a second bank of cylinders. Each of the first bank of cylinders and the second bank of cylinders may be coupled to an exhaust system, as will be described below with reference to FIG. 2.

Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber 30 (also termed, cylinder 30) of the engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel (not shown) to enable a starting operation of engine 10.

Combustion chamber 30 may receive intake air from intake manifold 44 via intake passage 42 and may exhaust combustion gases via exhaust manifold 48. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves.

Fuel injector 66 is shown arranged in intake manifold 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass airflow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 58 upstream of emission control device 70. Sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 58 downstream of exhaust gas sensor 126. Device 70 may be a three-way catalyst (TWC), NOx trap, various other emission control devices, or combinations thereof. In some embodiments, during operation of engine 10, emission control device 70 may be periodically reset by operating at least one cylinder of the engine within a particular air/fuel ratio. Full-volume exhaust gas sensor 76 is shown coupled to exhaust passage 58 downstream of emission control device 70. Sensor 76 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Further, a plurality of exhaust gas sensors may be located at partial volume locations within the emission control devices. As an example, the embodiment may include a mid-bed sensor to detect air-fuel ratio in the middle of the catalyst.

Other sensors 72 such as an air mass flow (AM) and/or a temperature sensor may be disposed upstream of emission control device 70 to monitor the AM and temperature of the exhaust gas entering the emission control device. The sensor locations shown in FIG. 1 are just one example of various possible configurations. For example, the emission control system may include a partial volume set-up with close coupled catalysts.

Engine 10 may further include a compression device such as a turbocharger or supercharger including at least a compressor 162 arranged along intake manifold 44. For a turbocharger, compressor 162 may be at least partially driven by a turbine 164 (e.g., via a shaft) arranged along exhaust passage 58. For a supercharger, compressor 162 may be at least partially driven by the engine 10 and/or an electric machine, and may not include a turbine. Thus, the amount of compression provided to one or more cylinders of the engine via a turbocharger or supercharger may be varied by controller 12.

In one example, during certain operating conditions, exhaust constituents and/or exhaust temperature and/or emission control device temperature may result in incomplete conversion of the exhaust constituents at the emission control device, degrading emissions. The exhaust system may be configured to temporarily store the exhaust from downstream of the emission control device until the emission control device and/or stored exhaust are optimal for converting the emissions to be released to atmosphere. FIGS. 2-6 further describe an exhaust system and methods for exhaust storage and recirculation during various engine-operating conditions.

Controller 12 is shown in FIG. 1 as a microcomputer, including microprocessor unit 102, input/output ports 104, an electronic storage medium for executable programs and calibration values shown as read only memory 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; air mass and/or temperature of the exhaust gas entering the catalyst from sensor 72; exhaust gas air-fuel ratio post-catalyst from sensor 76; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses for each revolution of the crankshaft. Additionally, controller 12 may communicate with a cluster display device 136, for example to alert the driver of faults in the engine or exhaust after-treatment system.

Storage medium read-only memory 106 can be programmed with computer readable data representing instructions executable by processor 102 for performing the methods described below as well as other variants that are anticipated but not specifically listed.

FIG. 2 illustrates an exhaust system 200 of an engine. In one example, the exhaust system 200 may be the exhaust system of the engine 10 illustrated in FIG. 1. The engine 10 may include a first set of cylinders 202 and a second set of cylinders 203. In one example, wherein the engine 10 is a six-cylinder engine, the first set of cylinders 202 and the second set of cylinders 203 may each include three adjacent cylinders.

Exhaust generated from each cylinder of the first set of cylinders 202 flows to a first exhaust pipe 206. Exhaust along the first exhaust pipe flows through a first catalytic converter 210 to atmosphere. Exhaust generated from each cylinder of the second set of cylinders 202 flows to a second exhaust pipe 216. Exhaust along the second exhaust pipe flows through a second catalytic converter 220 to atmosphere. The first catalytic converter 210 and the second catalytic converter 220 may each be similar to the emission control device 70 discussed above with reference to FIG. 1.

A first oxygen sensor 208 may be present along the first exhaust pipe upstream of the first catalytic converter 210 and a second oxygen sensor 212 may be present along the first exhaust pipe 206, downstream of the first catalytic converter 210. Additional sensors, such as temperature sensors, air mass flow sensors, etc., may be present along the first exhaust pipe upstream and/or downstream of the first catalytic converter 210.

A first valve 230 may be present along a segment 209 of the first exhaust pipe 206, the segment 209 being between the first oxygen sensor 208 and the first catalytic converter 210. A second valve 234 may be present along a second segment 213 of the first exhaust pipe 206, the second segment 213 being downstream of the second oxygen sensor 212. The second segment 213 is fluidically coupled to a tank 250 via a line 233, and second valve 234 is positioned to control flow of exhaust through line 233 to tank 250. The tank 250 is coupled to a compressor 252. The tank 250 is fluidically coupled to the segment 209 of the first exhaust pipe 206 through a line 231, exhaust flow through which is controlled by a first valve 230. In one example, the compressor 252 may be driven by the engine, for example, via a belt coupled to the engine crankshaft. In another example 252, the compressor may be electrically driven.

A similar configuration may be present along the second exhaust pipe 216. A third oxygen sensor 218 may be present along the second exhaust pipe 216 upstream of the second catalytic converter 220 and a fourth oxygen sensor 222 may be present along the second exhaust pipe downstream of the second catalytic converter 220. A third valve 232 may be present along a segment 219 of the second exhaust pipe 216, the segment 219 being between the third oxygen sensor 218 and the second catalytic converter 220. A fourth valve 236 may be present along a second segment 223 of the second exhaust pipe 216, the segment 223 being downstream of the fourth oxygen sensor 222. The segment 219 is fluidically coupled to the tank 250 via a line 235, and the fourth valve 236 is positioned to control flow of exhaust through line 237 to the tank 250. The tank 250 is coupled to the segment 219 of the second exhaust pipe 216 through a line 235, exhaust flow through which is controlled by a third valve 232.

A position of each of the first valve, the second valve, the third valve, and the fourth valve may be regulated by a controller, for example, the controller 12 of FIG. 1. The controller may regulate the position of each of the valves based on input from various sensors such as oxygen sensors, temperature sensors, etc. In one example, each of the valves may be a flap valve. In some examples, the valves may be continuously variable valves and may be adjusted to any position between a first position and a second position. The position of the valves during various engine-operating conditions will be discussed below with reference to FIGS. 4A-6.

In one example, when one set of cylinders are deactivated (such as in variable displacement engine (VDE) operation mode), for example, if the second set of cylinders are deactivated, then exhaust may flow only through the first exhaust pipe and only the position of the first valve and the second valve along the first exhaust pipe are regulated to store exhaust or to direct exhaust to atmosphere, depending on operating conditions. Because the second set of cylinders are deactivated, no exhaust may flow through the second exhaust pipe through the second catalytic converter. Hence, positions of the third and fourth valves may be maintained in a default position (the default position may be the first position for the third and the fourth valve).

In another example, the air-fuel ratio of exhaust flow through first exhaust pipe may be different from exhaust flow through the second exhaust pipe or vice versa (for example, if two cylinders in the first set of cylinders are deactivated while all three cylinders are active in the second set of cylinders). Hence, the first and the second valves along the first exhaust pipe may be regulated differently than the third and fourth valves along the second exhaust pipe either to direct exhaust from the respective exhaust pipe to the tank or to atmosphere based on operating parameters as will be discussed below.

Based on the positions of the first valve and the second valve along the first exhaust pipe, and the positions of the third valve and the fourth valve along the second exhaust pipe, exhaust flow may be directed through the first catalytic converter and through the second catalytic converter respectively to atmosphere, bypassing the tank 250. Alternatively, exhaust may be directed from downstream of the first catalytic converter, from downstream of the second catalytic converter for storage in the tank, and exhaust may be released form the tank, and may flow through the respective catalytic converters to atmosphere, as is described below with reference to FIGS. 3A-3C.

In another embodiment of an exhaust system, all the cylinders of the engine may be coupled to and hence configured to flow exhaust to a common exhaust pipe with an aftertreatment device (e.g., a catalytic converter). A valve upstream of the aftertreatment device and a valve downstream of the aftertreatment device may be present in the common exhaust pipe to flow exhaust from the aftertreatment device to atmosphere or to a storage tank. The flow of exhaust may be regulated by regulating the position of the valves as is described below with reference to FIGS. 3A-5.

FIGS. 3A-3C illustrate three different modes of operation of the exhaust system 200. During each mode of operation, the position of each of the valves regulates the direction of exhaust flow, as will be discussed below.

FIG. 3A shows a normal mode 300 of operation of the exhaust system 200 wherein exhaust generated by the engine cylinders flows through the catalytic converters to atmosphere. During the normal mode 300, exhaust generated by the first set of cylinders 202 may flow through the first exhaust pipe 206 and through the first catalytic converter 210 to atmosphere, bypassing the tank 250. In addition, the exhaust generated by the second set of cylinders 203 may flow through the second exhaust pipe 216 through the second catalytic converter 220 to atmosphere, bypassing the tank 250. The exhaust system may be operated in the normal mode of operation, for example, when the catalytic converters are at target operating temperature (such as light-off temperature), the engine is operating at steady state load (e.g., with no transient boost demand), the engine AFR is at stoichiometry, and the oxygen sensors along the exhaust pipes are not degraded.

During the normal mode 300, the first valve 230 may be in a first position. In the first position, the first valve 230 enables exhaust to flow through the first exhaust pipe 206 downstream of the first oxygen sensor to the first catalytic converter. The first valve 230 in the first position blocks fluidic communication between the first exhaust pipe and the line 231 connecting to the tank 250. The second valve 234 is in a first position that enables exhaust to flow from downstream of the first catalytic converter and downstream of the second oxygen sensor to atmosphere. The second valve in the first position blocks fluidic coupling between the first exhaust pipe 206 and the line 233 connecting to the tank 250.

During the normal mode 300, the third valve 232 may be in a first position. In the first position, the third valve 232 enables exhaust to flow through the second exhaust pipe downstream of the third oxygen sensor to the second catalytic converter. The third valve 232 in the first position blocks fluidic communication between the second exhaust pipe 216 and the line 235. The fourth valve 236 is in a first position that enables exhaust to flow from downstream of the second catalytic converter to atmosphere. The fourth valve 236 in the first position blocks fluidic coupling between the second exhaust pipe and the line 237. Thus, during the normal mode 300 of the exhaust system 200, there is no fluidic communication between the first exhaust pipe 206 and the tank 250 and between the second exhaust pipe 216 and the tank 250. The compressor 252 may be operating during the normal mode if there is previously stored exhaust present inside the tank 250. In one example, if no exhaust is stored in the tank, the compressor 252 may not be operating.

FIG. 3B shows an exhaust storage mode 302 of operation of the exhaust system 200, wherein exhaust generated by the engine cylinders flows through the catalytic converters to the tank for storage instead of being released to atmosphere. The exhaust system may be operated in the exhaust storage mode of operation, for example, when the catalytic converters are not at operating temperature, the engine is operating with transient conditions (e.g., transient boost demand), the engine AFR is not stoichiometric, and/or one or more oxygens sensors are determined to be degraded.

During the exhaust storage mode 302, exhaust generated by the first bank of cylinders may flow through the first exhaust pipe 206 and through the first catalytic converter 210 to the tank 250 along the line 233. In addition, exhaust generated by the second bank of cylinders may flow through the second exhaust pipe 216 and through the second catalytic converter 220 to the tank 250 along the line 237.

During the exhaust storage mode 302, the first valve 230 is in the first position. In the first position, the first valve 230 enables exhaust to flow through the first exhaust pipe downstream of the first oxygen sensor to the first catalytic converter. The first valve in the first position prevents fluidic communication between the first exhaust pipe and the line 231. The second valve 234 is in a second position and blocks exhaust flow from downstream of the first catalytic converter to atmosphere, but instead directs exhaust from downstream of the first catalytic converter to the tank 250 through the line 233.

During the exhaust storage mode 302, the third valve 232 is in the first position. In the first position, the third valve 232 enables exhaust to flow through the second exhaust pipe downstream of the third oxygen sensor to the second catalytic converter. The third valve in the first position prevents fluidic communication between the second exhaust pipe and the line 235. The fourth valve 236 is in the second position and blocks exhaust flow from the second catalytic converter to atmosphere and directs exhaust from downstream of the second catalytic converter to the tank through the line 237. The compressor 252 is operating during the storage mode, compressing the exhaust stored in the tank 250, thereby enabling a larger volume of exhaust to be stored in the tank versus if the exhaust is not compressed.

FIG. 3C shows an exhaust release mode 304 of operation of the exhaust system 200, wherein exhaust stored in the tank is recirculated through the catalytic converters and then released to atmosphere. The exhaust system may be operated in the exhaust release mode of operation, for example, during a vehicle stop condition when the tank has stored exhaust.

During the exhaust release mode 304, the first valve 230 is in a second position. In the second position, the first valve 230 establishes fluidic communication between the line 231 and first segment 209 that enables exhaust stored in the tank 250 to flow through the line 231 to the first exhaust pipe downstream of the first oxygen sensor and upstream of the first catalytic converter. The exhaust flows through the first catalytic converter. The second valve 234 is in the first position, which enables exhaust to flow from the first catalytic converter to atmosphere, bypassing the tank 250. In one example, during the exhaust release mode, the compressor 252 may be operating while exhaust is being directed from the tank to upstream of the catalytic converter. In another example, the compressor may not be operating while gas from the tank flows upstream of the catalytic converter during the release mode.

In one example, when the engine is running, a position of the second valve 234 during the release mode may establish fluidic communication between line 231 and the first catalytic converter and may fluidically connect the first exhaust pipe through the segment 209 to the catalytic converter. In another example, when the engine is off, the position of the second valve 234 during the release mode may only establish fluidic communication between line 231 and the first catalytic converter and may not fluidically connect the first exhaust pipe to the catalytic converter. In a further example, the second valve 234 during the release mode may establish fluidic communication of line 231 as well as the first exhaust pipe through the segment 209 to the first catalytic converter irrespective of whether the engine is operating or not. Similarly, in the second exhaust pipe during the exhaust release mode 304, the third valve 232 is in the second position. In the second position, the third valve 232 establishes fluidic communication between the line 235 and second segment 219 that enables exhaust stored in the tank to flow through the line 235 to the second exhaust pipe downstream of the third oxygen sensor and upstream of the second catalytic converter. The exhaust flows through the second catalytic converter. The fourth valve 236 is in the first position, which enables exhaust to flow from the second catalytic converter to atmosphere, bypassing the tank.

In one example, when the engine is running, a position of the third valve 232 during the release mode may establish fluidic communication between line 235 and the second catalytic converter 220 and may fluidically connect the second exhaust pipe 216 through the segment 219 to the second catalytic converter. In another example, when the engine is off, the position of the third valve 232 during the release mode may only establish fluidic communication between line 235 and the second catalytic converter 220 and may not fluidically connect the second exhaust pipe to the catalytic converter. In a further example, the third valve 232 during the release mode may establish fluidic communication of both line 235 and the second exhaust pipe 216 through the segment 219 to the second catalytic converter irrespective of whether the engine is operating.

Figure 4A:
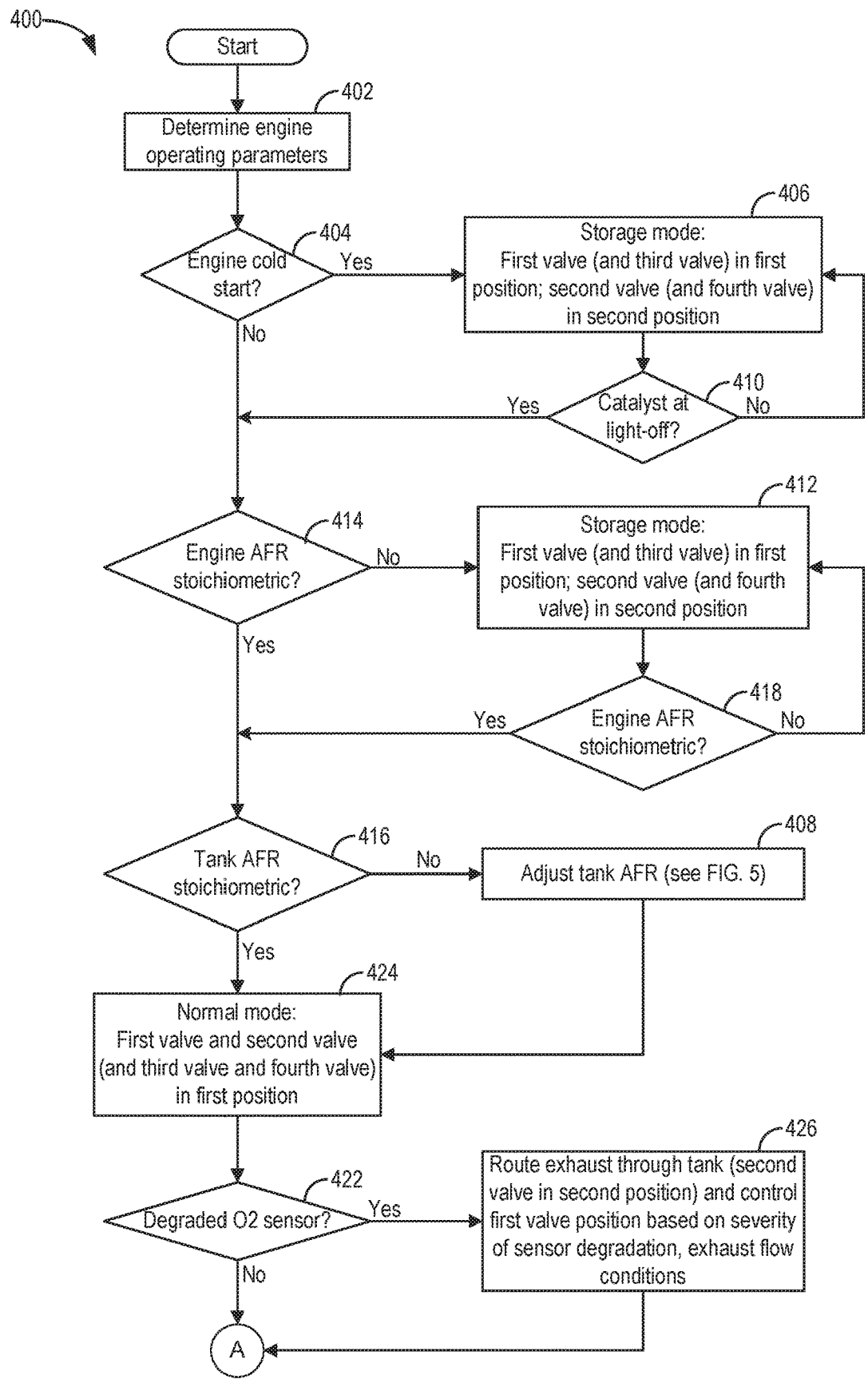
FIGS. 4A and 4B show flow charts depicting exhaust flow during various engine-operating conditions.

Turning to FIG. 4A, a flow chart illustrating an example method 400 for operating an exhaust system of an engine during various operating conditions is shown. In one example, the method 400 may be used to operate an exhaust system of an engine where exhaust from all cylinders of an engine flow to a common exhaust pipe that includes valves upstream and downstream of a catalytic converter fluidically connecting to a storage tank or to atmosphere. In another example, the exhaust system 200 of FIG. 2 may be operated by the method 400 in the modes illustrated in FIGS. 3A-3C, depending on the engine operating condition. The method 400 may operate the exhaust system 200 by adjusting positions of the first valve 230, upstream of the first catalytic converter 210, and the third valve 232, upstream of the second catalytic converter 220, and by adjusting positions of the second valve 234, downstream of the first catalytic converter 210, and the fourth valve 236, downstream of the second catalytic converter 220.

Instructions for carrying out method 400 and the rest of the methods included herein may be executed by a controller, for example, the controller 12 of FIG. 1, based on instructions stored on a memory of the controller and in conjunction with signals received from sensors of the engine system, such as the oxygen sensors 208, 212, 218, and 222 described above with reference to FIG. 2. The controller may employ engine actuators of the engine system to adjust position of one or more valves, such as the valves 230, 234, 232, and 236 of FIGS. 2-3C, regulating exhaust flow for storage in a tank or for releasing exhaust to atmosphere, according to the methods described below.

The method 400 starts at 402 by determining engine-operating conditions. The engine operating conditions determined may include but may not be limited to engine temperature, catalytic converter temperature, engine load, engine speed, engine air-fuel ratio, etc.

The method 400 proceeds to 404 to assess if the engine is operating under engine cold start conditions. Cold start conditions may include engine temperature below a threshold temperature, catalyst temperature below a threshold temperature, engine temperature being equal to ambient temperature at start-up, less than a threshold amount of time having elapsed since an engine start, or other suitable parameters.

During engine cold start conditions, engine temperature may be below standard operating temperature (e.g., below 90° C.) and thus one or more aftertreatment devices in the exhaust system, such as the first catalytic converter 210 and the second catalytic converter 220 of FIG. 2, may be below a light-off temperature. To enable aftertreatment device warm-up before releasing exhaust to atmosphere, exhaust may be routed from downstream of the catalytic converter to a storage tank with a compressor and not released to atmosphere. If the engine is operating under cold start conditions, method 400 proceeds to 406 to operate the exhaust system in a storage mode (as illustrated in FIG. 3B).

During the storage mode at 406, the first valve upstream of the first catalytic is in the first position fluidically connecting the first exhaust pipe to the catalytic converter, directing exhaust to flow from the first exhaust pipe through the first catalytic converter. The second valve downstream of the first catalytic converter is in the second position, fluidically coupling the first catalytic converter to the tank, directing exhaust from downstream of the first catalytic converter for storage in the tank.

Optionally, if exhaust is being generated from a second set of cylinders, the third valve upstream of the second catalytic is in the first position fluidically connecting the second exhaust pipe to the second catalytic converter, directing exhaust to flow from the second exhaust pipe through the second catalytic converter. The fourth valve downstream of the first catalytic converter is in the second position, directing exhaust from downstream of the second catalytic converter for storage in the tank.

The method 400 proceeds to 410 to assess if the catalytic converter is at a light-off temperature. If the catalyst is not at the light-off temperature at 410, the method 400 continues to operate the exhaust system in the exhaust storage mode of 406. The temperature of the first catalytic converter or the second catalytic converter or both the catalytic converters may be assessed. If the catalytic converter is at the light-off temperature at 410, the method 400 proceeds to 414 to determine if the engine AFR is stoichiometric.

The method 400 also proceeds to 414 if engine cold start conditions are not met at 404. At 414, the method 400 determines if engine air-fuel ratio is stoichiometric. A stoichiometric range of engine air-fuel ratio (AFR) indicates that exactly enough air is provided to completely burn all of the inside the combustion chamber of an engine. In one example, engine AFR may be considered stoichiometric when AFR is within a range, such as a range of ±5%, of the stoichiometric AFR. The determined AFR may include an average AFR over a threshold period of time, such as two or more engine cycles. In one example, stoichiometric AFR range may be determined based on the commanded AFR by the controller.

The AFR in the stoichiometric range has the optimal amount of air and fuel to produce a chemically complete combustion event with no unburnt fuel, which diminishes harmful emissions in the exhaust. In certain conditions, the AFR may not be stoichiometric (off-stoichiometry). AFR less than stoichiometry indicates that the air-fuel mixture is rich. Rich air-fuel mixture is less efficient as more fuel is present than the air can burn. Hence, incomplete combustion of the fuel happens. Rich AFR produces more power and burns cooler but produces higher levels of carbon monoxide. In contrast, AFR higher than stoichiometric indicates a lean air-fuel mixture. Lean air-fuel mixture burns efficiently (that is, all the fuel is burned, as enough air is present for complete combustion) but produces higher levels of nitrogen oxides.

AFR may be assessed by various sensors of the engine, for example, the sensor 126 and the sensor 76 of FIG. 1. The sensor 126 and the sensor 76 may be any suitable sensor for providing an indication of exhaust air-fuel ratio such as a linear oxygen sensor or UEGO (universal or wide-range exhaust gas oxygen), a two-state oxygen sensor or EGO, a HEGO (heated EGO), a NOx, HC, or CO sensor.

If engine AFR is not stoichiometric at 414 (for example, the engine AFR is either rich or lean), the method proceeds to 412, where the exhaust system is operated in a storage mode, similar to the storage mode of 406 (illustrated in FIG. 3B). In one example, the engine AFR may not be stoichiometric during a transient boost demand or other transient operating conditions.

The method 400 proceeds to 418 to assess if the engine AFR is stoichiometric, as described above for 414. If the engine AFR is not stoichiometric at 418, the method 400 continues to operate the exhaust system in the storage mode of 412. If the engine AFR is stoichiometric at 418, the method 400 proceeds to 416 to assess if exhaust stored in the tank is stoichiometric.

If engine AFR is stoichiometric at 414, the method 400 proceeds to 416 to determine if the tank AFR is stoichiometric. The AFR of exhaust stored in the tank may depend on the AFR of the exhaust exiting the engine and being stored in the tank. For example, rich and/or lean exhaust may be stored in the tank if the engine AFR deviates from the stoichiometric range (for example, during transient boost demand, during deceleration, or during other transient conditions). Further, exhaust that is stoichiometric, for example, during cold start conditions, may also be stored in the storage tank. The tank stoichiometry at a given time may thus be based on this mixture of exhausts stored in the tank. In one example, exhaust AFR and mass flow of exhaust each time it is stored in the tank may be tracked and an instantaneous calculation of the exhaust AFR in the tank may be made. In one example, sensor/s (for example, oxygen sensors) may be directly coupled inside the storage tank to provide input to determine exhaust AFR in the tank.

If the AFR in the tank is not stoichiometric at 416, the method 400 proceeds to 408 to adjust tank AFR, for example the tank AFR may be adjusted until the tank AFR reaches stoichiometry. Adjusting the tank AFR will be described below with reference to FIG. 5. After adjusting the tank AFR at 408, the method 400 proceeds to operate the system in the normal mode 424. Also, if the tank AFR is already stoichiometric at 416, the method 440 operates the exhaust system in the normal mode at 424. During the normal mode of operation, the first valve and the second valve along the first exhaust pipe are each in the first position, directing exhaust generated by the first set of cylinders to flow through the first catalytic converter to atmosphere. Optionally, the third valve and the fourth valve along the second exhaust pipe are each in the first position, directing exhaust generated by the second set of cylinders to flow through the second catalytic converter to atmosphere. The exhaust system in the normal mode of operation is illustrated in FIG. 3A.

The method 400 proceeds to 422 and determines if there is a degraded oxygen sensor. In one example, the degradation of the oxygen sensor may be symmetric type degradation (e.g., symmetric delay, symmetric slow response) that affects both lean-to-rich and rich-to-lean exhaust gas sensor response rates. In another example, the degradation of the oxygen sensor may be asymmetric, where either only lean-to-rich AFR transition response is altered or only rich-to-lean AFR transition response is altered. The delay type degradation behaviors may be associated with the initial reaction of the exhaust gas sensor to a change in exhaust gas composition and the slow response type degradation behaviors may be associated with a duration after an initial exhaust gas sensor response to transition from a rich-to-lean or lean-to-rich exhaust gas sensor output. To detect degradation of oxygen sensors, the engine may be purposely operated with one or more rich-to-lean or lean-to-rich transitions to monitor exhaust gas sensor response. If there is a degraded oxygen sensor, the method 400 proceeds to 426 where exhaust is routed to the tank through the second valve in the second position and the position of the first valve may be controlled based on the severity of the sensor degradation and depending on exhaust flow conditions.

In one example, the severity of the sensor degradation may be determined based on a transition response time while the engine is purposely operated with one or more rich-to-lean or lean-to-rich transitions to monitor sensor response. If the oxygen sensor degradation is severe (for example, the transition response time is more than a threshold time), the first valve may be in the first position, blocking fluidic coupling of the tank to upstream of the catalytic converter. Hence, the exhaust directed to the tank through the second valve in the second position is stored in the tank for a duration of time before being recirculated through the catalytic converter. The exhaust directed to the tank mixes with the exhaust already present in the tank, altering the AFR of the exhaust in the tank. If the sensor degradation is not severe (for example, the transition response time is less than the threshold time), the first valve may be in the second position fluidically connecting the tank to upstream of the catalytic converter and at the same time may flow exhaust from the engine to the catalytic converter. In another example, even if the sensor degradation is not severe, but a high volume of exhaust is being generated by the engine, the first valve may be in the first position, fluidically connecting only the engine cylinders to the catalytic converter while blocking flow of exhaust from the tank to upstream of the catalytic converter.

If no degraded oxygen sensor is detected, the method 400 proceeds to 430 (illustrated in FIG. 4B) to assess if tank pressure (P_tank) is more than a minimum pressure (P_min) inside the tank, where P_min may be ambient pressure. If P_tank is not more than P_min, it indicates that the tank has no stored exhaust and hence, the exhaust system continues to operate in the normal mode at 440, similar to the normal mode at 424 of FIG. 4A. However, if P_tank is more than P_min at 430, there is stored exhaust in the tank. Hence, the method 400 proceeds to 432 to assess if conditions for release of exhaust from the tank are met. The conditions for release of exhaust from the tank may include exhaust mass flow below a threshold (where the threshold may define an exhaust mass flow below which the system can handle the volume from the tank flowing through the exhaust pipe to the catalytic converter, e.g., without flowing backwards to atmosphere or to the engine and without compromising conversion of emissions at the catalytic converter). The exhaust mass flow may be estimated according to engine speed and load in one example, e.g., exhaust mass flow be output from a look-up table indexed to engine speed and load. As engine speed and load increase, exhaust mass flow may also increase. Further, exhaust mass flow may be a function of exhaust temperature and exhaust pressure, which may be measured by one or more sensors in the exhaust system.

If conditions for release are not met, the method 400 continues to operate the system in the normal mode at 440. If release conditions are met at 432, the method 400 proceeds to release mode at 434. During the release mode, the second valve downstream of the first catalytic converter is maintained in the first position, blocking fluidic communication of the first exhaust pipe downstream of the first catalytic converter to the storage tank. The first valve is positioned in the second position, enabling fluidic communication of the tank to the first exhaust pipe upstream of the first catalytic converters. In one example, the second position of the first valve may fluidically connect the first set of cylinders to the first catalytic converter as well as fluidically connect the tank to the catalytic converter. Thus, exhaust from both the cylinders and the tank may flow through the catalytic converter to atmosphere. In another example, the second position of the first valve may fluidically connect the tank to upstream of the catalytic converter while blocking fluidic connection of the cylinders to the catalytic converter, for example, when the engine is not operating (hence, no exhaust is being generated by the cylinders).

Optionally, the fourth valve downstream of the second exhaust pipe is maintained in the first position, blocking fluidic communication of the second exhaust pipe downstream of the second catalytic converter to the storage tank. The third valve is positioned in the second position, enabling fluidic communication of the tank to the second exhaust pipe upstream of the second catalytic converter.

The method 400 proceeds to 436 to assess if P_tank is more than P_min. If P_tank is more than P_min, there is additional exhaust stored in the tank and the exhaust system continues to operate in the release mode of 434, assuming that the release mode conditions are being met. If P_tank is not more than P_min, the tank does not have appreciable stored exhaust and the system operates in the normal mode at 438. The method 400 then returns.

Referring back to 440, where the method 400 is operating the system in the normal mode, the method 400 then proceeds to 442 to determine if engine stop condition are met. Engine stop conditions include the engine not rotating, the engine not combusting fuel, engine speed being zero, etc. During engine stop conditions, due to absence of fuel combustion and lack of intake air drawn through the engine, no exhaust is generated. If engine stop conditions are not met at 442, the method 400 continues to operate in the normal mode at 440. If the stop conditions are met at 442, the method 400 proceeds to 448, where the exhaust system is operated in the release mode to empty the tank. During the release mode the first valve is placed in the second position, fluidically coupling the tank to upstream of the catalytic converter, and the second valve is placed in the first position, fluidically connecting the catalytic converter to atmosphere. Optionally, during the release mode, the third valve is placed in the second position, fluidically coupling the tank to upstream of the catalytic converter, and the fourth valve is placed in the first position, fluidically connecting the catalytic converter to atmosphere. In one example, after stop conditions are met, the exhaust system may be operated in the release mode only when vacuum conditions in the exhaust system are present (e.g., a lower amount of pressure in the exhaust passage upstream and/or at the catalyst than in the storage tank), such that the exhaust is directed through the catalyst and is not allowed to sit in the tank or be released through the engine. For example, if the engine stop conditions occur when the tank is under a relatively small amount of pressure, rather than being released to travel through the catalyst, the exhaust in the tank may instead remain in the tank if vacuum conditions are not present. This may lead to the exhaust eventually being released to atmosphere via the engine, exhaust gas recirculation passage, or other conduit. Thus, the system may continue to operate in the normal mode if vacuum conditions are not present, at least in some examples.

The method 400 proceeds to 450 and determines if a pressure inside the tank P_tank is more than a minimum pressure P_min. P_tank being more than P_min indicates that the tank has stored exhaust and hence the exhaust system continues to be operated in the release mode of 448 to empty the tank. If the P_tank is not more than P_min (that is, P_tank is equal to P_min), it indicates that the tank is sufficiently empty, and the method 400 proceeds to 452 where the valves are adjusted to respective default positions. In one example, the default positions of the valves may be same as the positions of the valves during the release mode. In another example, the default positions of the valves may be the positions of the valves in the normal mode, flowing exhaust through the catalytic converter to atmosphere. In a still further example, the default position of the valves may be the positions the valves assume during the storage mode, in anticipation of a subsequent engine cold start following the engine stop. The method 400 then returns.

Figure 5:
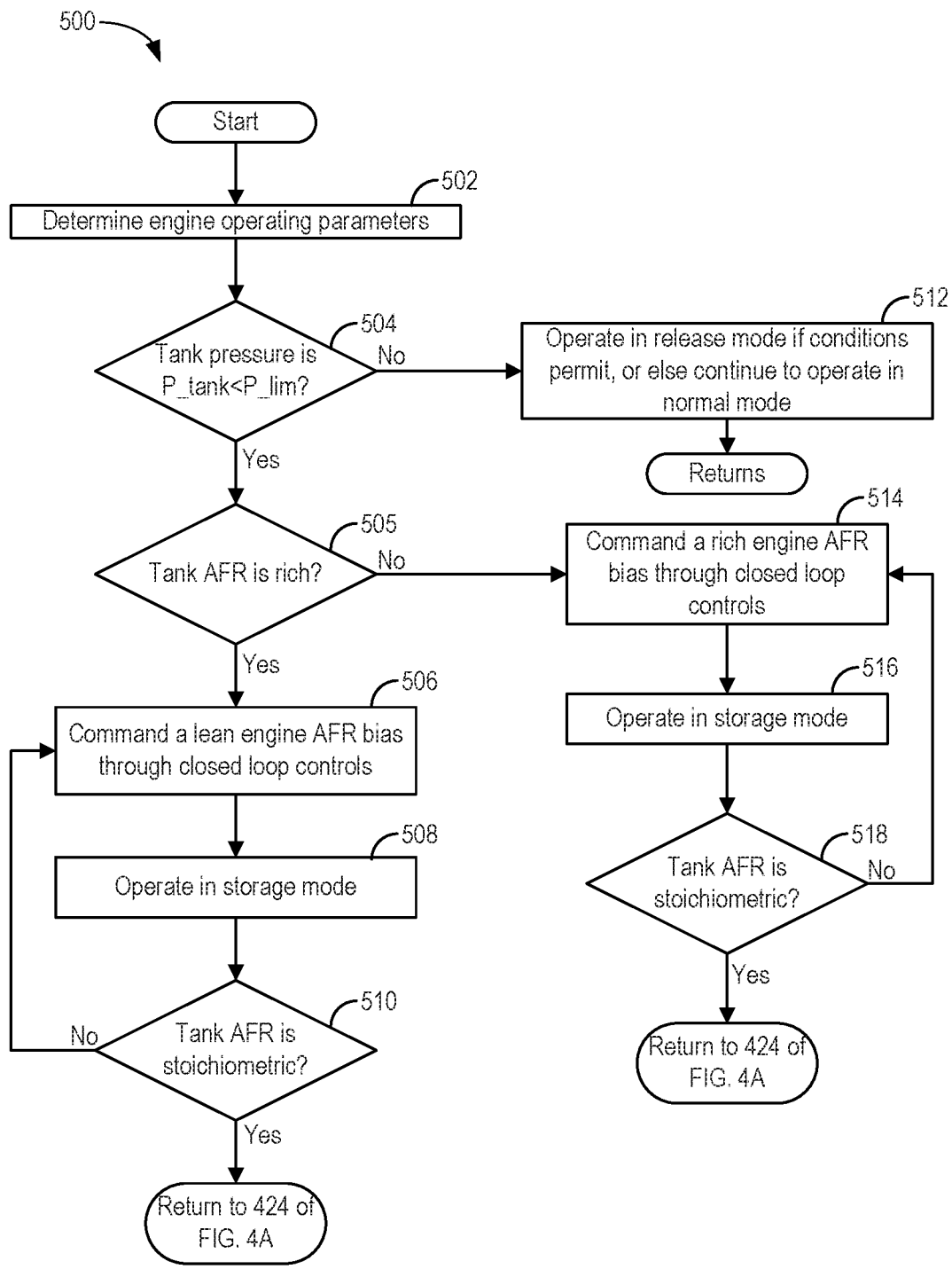
FIG. 5 illustrates a method of flowing exhaust during various engine air-fuel ratios.

FIG. 5 illustrates an example method 500 for operating an exhaust system of an engine. In one example the method 500 may be carried out in order to operate an exhaust system of an engine where exhaust from all cylinders of an engine flow to a common exhaust pipe that includes valves upstream and downstream of a catalytic converter fluidically connecting to a storage tank or to atmosphere. In another example, method 500 may be carried out to operate the exhaust system 200 of FIG. 2 in the modes illustrated in FIGS. 3A-3C, depending on the engine operating condition. The method 500 may operate the exhaust system 200 by adjusting positions of the first valve 230, upstream of the first catalytic converter 210, and the third valve 232, upstream of the second catalytic converter 220, and by adjusting positions of the second valve 234, downstream of the first catalytic converter 210, and the fourth valve 236, downstream of the second catalytic converter 220.

Instructions for carrying out method 500 and the rest of the methods included herein may be executed by a controller, for example, the controller 12 of FIG. 1, based on instructions stored on a memory of the controller and in conjunction with signals received from sensors of the engine system, such as the oxygen sensors 208, 212, 218, and 222 described above with reference to FIG. 2. The controller may employ engine actuators of the engine system to adjust position of one or more valves, such as the valves 230, 234, 232, and 236 of FIGS. 2-3C, regulating exhaust flow for storage in a tank or for releasing exhaust to atmosphere, according to the methods described below.

The method 500 begins at 502 by determining engine operating conditions. The engine operating conditions determined may include but are not limited to engine temperature, catalytic converter temperature, engine load, engine speed, engine air fuel ratio etc.

The method 500 proceeds to 504 to determine if the P_tank is less than a maximum pressure of the tank, P_lim. If the P_tank is not less than the maximum pressure P_lim, the method 500 proceeds to 512 where the exhaust system is operated in the release mode, if the conditions for release mode are met, for example, which may include exhaust mass flow being below a threshold level. During the release mode, the valve positions are regulated to flow exhaust from the tank through the catalytic converter to atmosphere, as described above with reference to FIGS. 4A-4B. If release conditions are not met, the exhaust system operates in the normal mode. During the normal mode, exhaust may flow through the catalytic converter to atmosphere, bypassing the tank. As described above with reference to FIGS. 4A-4B, during the normal mode, the first and the second valves may be in the first position. Optionally, the third and fourth valves may be in the first position, directing exhaust through the second catalytic converter to atmosphere. The method 500 then returns.

If the P_tank is less than the maximum pressure P_lim (that is, storage capacity is available in the tank), the method 500 proceeds to 505 to assess if the tank AFR is rich. If the tank AFR is rich, the method 500 proceeds to 506. At 506, a lean engine AFR bias through closed loop controls is performed such that lean engine exhaust is generated. The lean engine exhaust is directed to the tank at 508, where the exhaust system operates in the storage mode. During the storage mode, exhaust flows from downstream of the catalytic converter to the tank and not to atmosphere. The valve positions during the storage mode are as described with reference to 406 of FIG. 4A. The lean engine AFR directed to the tank mixes with the rich AFR in the tank to change the AFR in the tank from rich towards the stoichiometric range.

After operating the exhaust system in the storage mode at 508 for a specified duration of time, the method 500 proceeds to 510 to assess if the tank AFR is stoichiometric. As explained above with respect to FIG. 4A, the tank AFR may be measured by one or more oxygen sensors coupled to the tank and/or the tank AFR may be estimated using a model that calculates tank AFR based on engine exhaust AFR (measured by one or more oxygen sensors) and exhaust mass flow during operation in the exhaust storage mode. At 510, if the tank AFR is not stoichiometric, method 500 loops back to 506, continues to operate with a lean engine AFR, and continues to store the lean exhaust in the tank. If the tank AFR is stoichiometric, the method 500 returns to 424 of FIG. 4A, where the exhaust system is operated in the normal mode.

If the tank AFR is not rich at 504, the method 500 proceeds to 514. At 514, a rich engine AFR bias through closed loop controls is performed such that rich engine exhaust is generated. The rich engine exhaust is directed to the tank at 516, where the exhaust system operates in the storage mode. During the storage mode, exhaust flows from downstream of the catalytic converter to the tank and not to atmosphere. The valve positions during the storage mode are as described with reference to 406 of FIG. 4A. The rich engine AFR directed to the tank mixes with the lean AFR in the tank to change the AFR in the tank from lean towards the stoichiometric range.

After operating in the storage mode, for example, for a specified duration, the method 500 proceeds to 518 to assess if the tank AFR is stoichiometric. At 518, if the tank AFR is not stoichiometric, the exhaust system loops back to 514 and continues to operate with rich engine AFR in the exhaust storage mode. If the tank AFR is stoichiometric, the method 500 returns to 424 of FIG. 4A, where the exhaust system is operated in the normal mode.

Figure 4B:
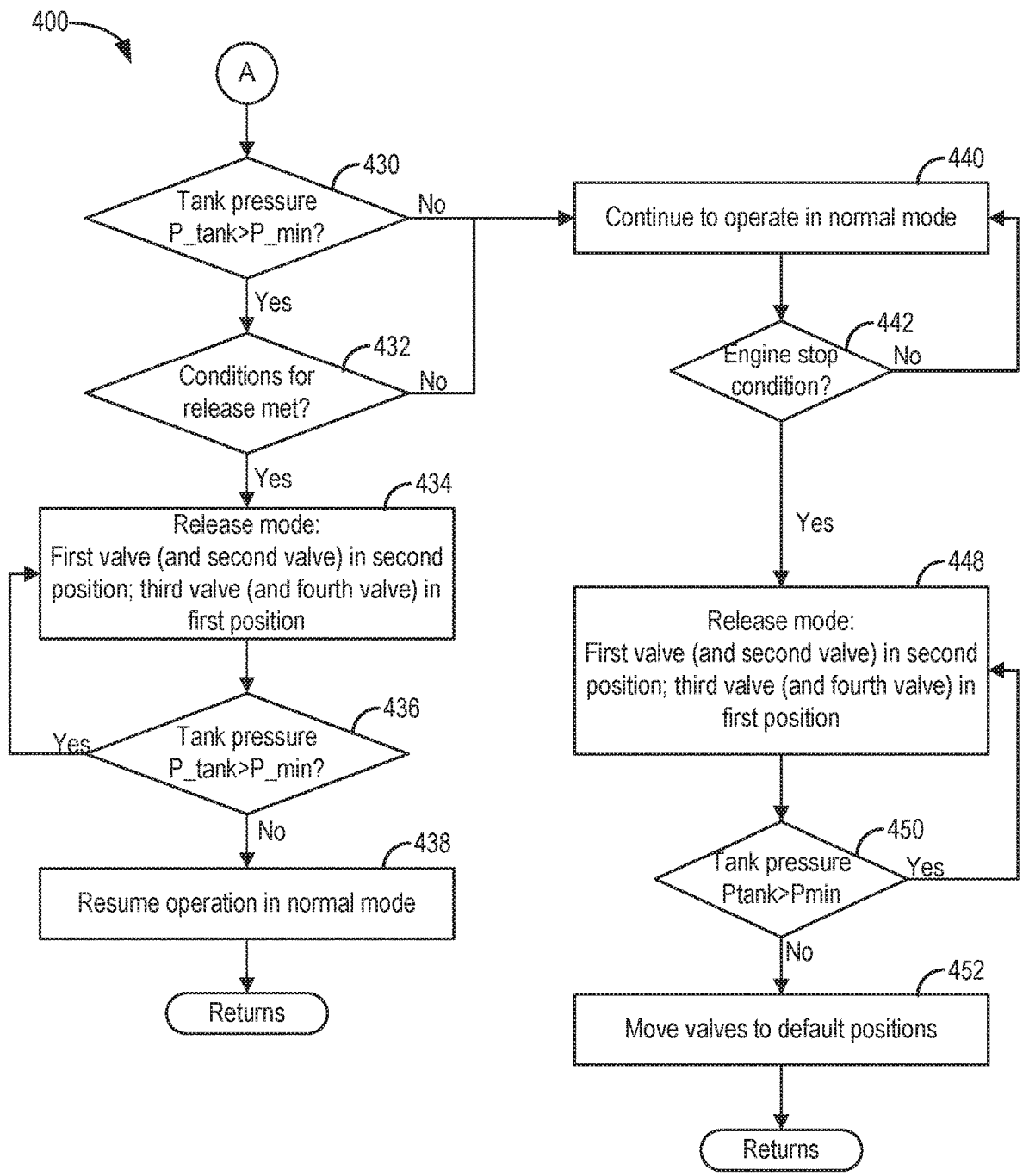

Thus, methods 400 and 500 of FIGS. 4A, 4B, and 5 provide for storing exhaust gas in a storage tank during certain modes of operation. In one example, exhaust gas may be stored in the tank during an engine cold start, where an emissions control device (e.g., a three-way catalytic converter) is operating below light-off temperature. When the emissions control device is below light-off temperature, the emissions in the exhaust may not be converted at the highest efficiency, thus compromising emissions if the exhaust gas were released to atmosphere. By storing exhaust gas in the tank during engine cold start, the exhaust gas that has already passed through the emissions control device may be kept in the exhaust system, rather than released to atmosphere, until the emissions control device has reached operating temperature. The exhaust gas may be released from the tank to the emissions control device during relatively low exhaust gas flow conditions once the emissions control device has reached light-off temperature, such that the constituents still present in the stored exhaust gas may be converted and the exhaust may be released to atmosphere.

In another example, exhaust gas may be stored in the tank responsive to the engine air-fuel ratio deviating from stoichiometric air-fuel ratio. For example, during certain transient conditions such as an operator tip-in, the engine may be operated rich or lean (e.g., the engine may be operated rich to meet a transient boost demand). As emissions control devices operate at highest conversion efficiency at stoichiometric air-fuel ratio, these rich or lean excursions may compromise emissions. Thus, when the engine air-fuel ratio is not stoichiometric, the exhaust gas may be stored in the tank.

The air-fuel ratio of the exhaust gas stored in the tank may be measured and/or estimated, and if the tank air-fuel ratio is not stoichiometric, the air-fuel ratio of exhaust gas in the tank may be adjusted to reach stoichiometry. For example, the engine may be operated with a rich or lean air-fuel ratio bias (e.g., the fuel injectors may be controlled to inject more or less fuel), to the extent possible while still maintaining requested torque, and the exhaust gas may be routed to the tank instead of atmosphere, until the tank reaches stoichiometry. In another example, the engine air-fuel ratio may be adjusted by adjusting throttle position, boost pressure, exhaust gas recirculation rate, or other suitable parameter. Further, if the engine is operated with a lean or rich air-fuel ratio bias by adjusting the amount of injected fuel or intake air mass flow, requested torque may be maintained by adjusting ignition timing, boost pressure, or other suitable parameter.

In a further example, exhaust gas may be at least routed through the tank in response to a degraded oxygen sensor. As explained previously, some types of sensor degradation may result in engine air-fuel ratio control that leads to lean-to-rich and/or rich-to-lean engine air-fuel ratio switches that are longer than expected. When the engine operates with longer periods of rich and/or lean air-fuel ratio, the exhaust may reach the emissions control device still in the lean or rich state (e.g., the switching between rich and lean may not occur with high enough frequency to allow sufficient mixing of the lean and rich exhaust prior to reaching the emissions control device). Thus, to provide additional time and volume for exhaust mixing, the exhaust may be routed through the tank. In some examples, the exhaust may be stored in the tank for a duration. In other examples, the exhaust may not be stored in the tank but only routed through the tank. The flow rate and/or storage duration of exhaust in the tank may be a function of the severity of the sensor degradation (e.g., how frequently the air-fuel ratio switches from lean to rich and vice versa) and the exhaust gas mass flow. For example, if the sensor is exhibiting a relatively high amount of degradation such that the switching frequency is low, the exhaust gas may be stored in the tank for a longer amount of time than if the sensor is exhibiting a relatively low amount of degradation, such that the switching frequency is relatively high.

Methods 400 and 500 were described above in the context of a single emissions control device (e.g., catalytic converter) being fed exhaust gas from all cylinders of the engine, or in the context of multiple emissions control devices (e.g., multiple catalytic converters) being fed exhaust gas from different sets of cylinders (e.g., different cylinder banks). In the case of multiple catalytic converters, methods 400 and 500 included exhaust gas flow controls that were identical/in tandem for both catalytic converters. However, in systems such as those illustrated in FIGS. 2-3C, the flow of exhaust gas though the catalytic converters and to atmosphere or to the tank may be controlled differentially depending on operating conditions. For example, during certain conditions, such as low engine load, one or more cylinders of the engine may be deactivated, leading to one set of cylinders having a different air-fuel ratio than the other set of cylinders (e.g., one bank of cylinders may be deactivated while the other bank remains activated). In these conditions, exhaust gas from one set of cylinders may be sent to the tank while the exhaust gas from the other set of cylinders is sent to atmosphere.

FIG. 6 shows an example operating sequence 600 of an exhaust system coupled to an engine of the vehicle. The example operating sequence 600 may be generated during operation of the exhaust system 200 discussed above with reference to FIGS. 1-3C. Plotted along the Y-axis is a plot 602 indicating a temperature of the catalytic converter of the exhaust system (for example, the temperature of the first catalytic converter 210 and/or the second catalytic converter 220 of FIG. 2), the values of which increase along the Y-axis. Engine load is illustrated by plot 604. The position of the first and the third valves upstream of the first and the second catalytic converters respectively (for example, the valve 230 and the valve 232 of FIG. 2) is indicated by the plot 606. The position of the second and the fourth valves downstream of the first and the second catalytic converters respectively (for example, the valve 234 and the valve 236 of FIG. 2) is indicated by the plot 608. Exhaust storage tank pressure is indicated by the plot 610, with a maximum tank pressure shown by line 611. Engine AFR is indicated by a plot 612 and a range 613 indicates a stoichiometric AFR range. A plot 614 indicates AFR in the tank, wherein 615 indicates a stoichiometric range of the tank AFR. The X-axis represents time, increasing from the left side of the figure to the right side of the figure. Vertical markers (with dashed lines) indicate the times of interest.

Prior to T1, during cold start conditions, the engine load starts increasing gradually (plot 604), while the temperature of the catalytic converter (plot 602) is below a threshold temperature 601 (e.g., below a light-off temperature of the catalytic converter). The engine AFR (plot 612) is rich during cold start conditions and thus is not within the engine AFR stoichiometric range (plot 613). Due to low engine temperature during cold start conditions, there is diminished fuel vaporization (that is, more fuel sticks to combustion cylinder walls etc.) requiring more fuel injection ratio to achieve desired combustion. The first and the third valves are in the first position and the second and fourth valves are in the second position, directing exhaust for storage in the tank (e.g., the exhaust system is in the storage mode). The exhaust is directed to the tank as the catalytic converter has not yet reached the operating temperature and hence may not oxidize and/or reduce all the constituents of the exhaust efficiently. The tank pressure increases (plot 610), as exhaust gas is stored in the tank. Prior to T1', very little exhaust is present inside the tank (the tank AFR is not measureable) but as exhaust continues to be directed to the tank for storage during T1'-T1, the tank AFR becomes measurable and is rich prior to T1.

During T1-T2, the engine load continues to increase (plot 604), and the temperature of the catalytic converter (plot 602) increases but is still below the threshold temperature 601. The engine AFR continues to be rich and outside the stoichiometric range (plot 612). The storage mode continues during T1-T2, where the first and the third valves are in the first position (plot 606) and the second and fourth valves are in the second position (plot 608), directing exhaust for storage in the tank. The tank pressure increases (plot 610), as exhaust gas is stored in the tank. The tank AFR (plot 614) continues to be rich and outside of the stoichiometric range 615.

The engine AFR (plot 612) is within the stoichiometric AFR range 613 and the tank AFR (plot 614) continues to be outside the stoichiometric range during T2-T3. At T2, the catalyst temperature (plot 602) reaches the threshold temperature 601. Hence, the exhaust is directed through the catalytic converter to atmosphere, for which the first and the third valves are in the first position (plot 606) and the second and the fourth valves are in the first position (plot 608). Since no exhaust is being directed to the tank, the pressure inside the tank (plot 610) is not increasing during T2-T3.

The exhaust system continues to operate in the normal mode during T3-T4. At T4 there is a rapid increase in engine load (plot 604), which results in a transient boost demand to meet requested torque, for example, due to a driver tip-in. At T4, the engine AFR is rich (off-stoichiometry) to meet the transient boost demand. During T4-T5, in response to the rich AFR, the exhaust system is operated in the storage mode where the first and the third valves are in the first position and the second and fourth valves are in the second position, directing exhaust to the tank for storage. The tank pressure (plot 610) continues to increase during T4-T5 while the tank AFR continues to be rich and outside of the stoichiometric range during T4-T5.

During T5-T6, the engine load (plot 604) decreases, for example, the vehicle enters a deceleration shut-off mode where fuel injection to the cylinders is suspended. The engine AFR (plot 612) is lean and outside the stoichiometric range 613. Therefore, during T5-T6, the storage mode of operation continues, wherein the first and the third valve continue to be in the first position and the second and fourth valves are in the second position, directing exhaust from downstream of the catalytic converters to flow to the tank. The lean exhaust directed to the tank for storage mixes with the rich exhaust in the tank and the tank AFR approaches the stoichiometric range 615. The pressure inside the tank continues to increase during T5-T6 but is still below the threshold pressure 611. The catalyst temperature continues to be more than the threshold temperature during this period.

During T6-T7, the engine AFR (plot 612) continues to be operated lean, for example, in response to the tank AFR being rich and outside the stoichiometric range 615. The lean engine AFR is directed to the tank as the exhaust system continues to be in the storage mode during T6-T7. As lean engine exhaust flows to the tank, the tank pressure (plot 610) increases. The lean engine exhaust directed to the tank during T6-T7 mixes with the rich exhaust in the tank, changing the stoichiometry of the tank AFR from rich to within the stoichiometric range 615 at T7. At T7, the engine AFR goes back to stoichiometric range 613 as the tank AFR is now stoichiometric. At T7, the tank pressure reaches the threshold pressure 611.

During T7-T8, the exhaust system operates in the release mode in response to the tank reaching the threshold pressure 611, wherein exhaust flows from the tank through the first valve and the third valve in the second position to upstream of the catalytic converters. The exhaust then flows through the catalytic converters and through the second and fourth valves in the first position to atmosphere, bypassing the tank. At T7, the AFR in the tank is stoichiometric, the engine AFR (plot 612) is stoichiometric, and the catalyst is at the light off temperature. The tank pressure decreases during T7-T8 as exhaust is released from the tank and is at or slightly below atmospheric pressure at T8 as the tank is empty. The tank AFR is not relevant and/or measurable after T8. During T7-T8, the engine is operating at a low load (plot 604).

At T8, the release mode ends, and the normal mode starts, where the first and the third valves are in the first position and the second and the fourth valves are in the first position, directing exhaust flow through the catalytic converters to atmosphere, bypassing the tank. The catalyst continues to be at the target operating temperature, and the engine AFR is stoichiometric after T8.

In this way, exhaust generated by an engine may be directed to a tank coupled to an exhaust pipe downstream of one or more emission control devices, instead of being released to atmosphere. The exhaust may be compressed and stored in the tank when the emission control devices are not at an operating temperature, or when the emission control devices are at the operating temperature but the engine AFR is not stoichiometric or when oxygen sensor/s coupled to the exhaust system are degraded. The compression of the exhaust stored in the tank enables a large volume of exhaust to be stored in the tank before release. The exhaust is released from the tank when the emission control devices are at the operating temperature along with the engine AFR and the tank AFR being stoichiometric. The released exhaust flows through the emission control devices, which convert emissions in the exhaust before the exhaust is released to atmosphere.

The technical effect of storing exhaust in the tank during various operating conditions, such as, when the emission control devices are at the operating temperature but the engine AFR is not stoichiometric, is the prevention of exhaust with a high load of undesirable constituents such as CO and NOx from being released to atmosphere, thereby reducing tailpipe emissions.

An example method for operating an exhaust system of an engine comprises directing a flow of exhaust gas from downstream of a catalytic converter to a tank in response to engine air-fuel ratio deviating from a threshold air-fuel ratio, adjusting an air-fuel ratio of the exhaust gas in the tank, and selectively releasing the exhaust gas from the tank to upstream of the catalytic converter, the released exhaust gas adjusted to the threshold air-fuel ratio. In the preceding example, additionally or optionally, the threshold air-fuel ratio comprises stoichiometric air-fuel ratio. In any or all of the preceding examples, additionally or optionally, a temperature of the catalytic converter is more than a threshold temperature while directing the flow of exhaust gas from downstream of the catalytic converter to the tank. In any or all of the preceding examples, additionally or optionally, the method further comprises directing a flow of exhaust gas from downstream of the catalytic converter to the tank responsive to the temperature of the catalytic converter being less than the threshold temperature. In any or all of the preceding examples, additionally or optionally, the method further comprises selectively releasing the exhaust gas from the tank comprises directing the exhaust gas from the tank to upstream of the catalytic converter in response to a pressure inside the tank being more than a minimum pressure and a temperature of the catalytic converter being more than a threshold temperature. In any or all of the preceding examples, additionally or optionally, directing the flow of exhaust gas from downstream of the catalytic converter to the tank includes: adjusting a position of a first valve upstream of the catalytic converter to a first position of the first valve thereby establishing fluidic communication between the engine and an inlet of the catalytic converter, and adjusting a position of a second valve downstream of the catalytic converter to a second position of the second valve thereby establishing fluidic communication between an outlet of the catalytic converter and the tank. In any or all of the preceding examples, additionally or optionally, selectively releasing the exhaust gas from the tank includes: adjusting the position of the first valve to a second position of the first valve thereby establishing fluidic communication between the tank and the inlet of the catalytic converter; and adjusting the position of the second valve to a first position of the second valve thereby blocking the fluidic communication between the outlet of the catalytic converter and the tank. In any or all of the preceding examples, additionally or option-ally, the method further comprises directing a flow of exhaust gas from downstream of the catalytic converter to the tank in response to a degraded oxygen sensor upstream of the second valve.

Another example method for operating an exhaust system comprises responsive to a degraded oxygen sensor, directing exhaust flow through a catalytic converter to a tank of the exhaust system and controlling an amount of the exhaust flow directed back to the catalytic converter by regulating a position of a first valve coupled between the tank and upstream of the catalytic converter. In the preceding example, additionally or optionally, the method further comprises responsive to an air-fuel ratio of exhaust in the tank being stoichiometric, operating the exhaust system in an exhaust release mode by directing exhaust from the tank through the first valve into the catalytic converter and from the catalytic converter to atmosphere, bypassing the compressor tank, the exhaust from the catalytic converter to atmosphere controlled via a second valve downstream of the catalytic converter. In any or all of the preceding examples, additionally or optionally, during the exhaust release mode, a temperature of the catalytic converter is above a threshold temperature. In any or all of the preceding examples, additionally or optionally, during the exhaust release mode a pressure inside the tank is more than a minimum pressure of the tank and is less than or equal to a maximum pressure of the tank, the maximum pressure of the tank being greater than the minimum pressure of the compressor tank. In any or all of the preceding examples, additionally or optionally, the method further comprises the degraded oxygen sensor is positioned upstream of the first valve.

In the examples herein, the system may estimate the air-fuel ratio of the overall gas mixture held in the tank during engine operation, and further during engine shut-down and during engine-off and/or vehicle-off durations. The tank may be vented during engine/vehicle-off conditions in response to catalyst temperature being above a threshold, e.g., light-off, temperature determined by the controller. The estimate of the air-fuel ratio may be based on a duration of venting to the exhaust and then atmosphere during and in response to the engine/vehicle-off duration. The estimate may be based on diffusion flow estimates of exhaust constituent migration determined by the controller, where the estimated air-fuel ratio may decrease toward less/rich and/or more/lean as temperature decreases and the duration increases to asymptotically approach a new equilibrium air-fuel ratio in the tank.

An example system comprises an exhaust pipe configured to flow exhaust from an engine to atmosphere via a catalytic converter, a tank coupled to the exhaust pipe through each of a first valve and a second valve, and a controller storing non-transitory instructions in memory that when executed cause the controller to adjust a position of the first valve and adjust a position of the second valve to store exhaust from downstream of the catalytic converter in the tank responsive to an engine air-fuel ratio deviating from stoichiometric air-fuel ratio. In the preceding example, additionally or optionally, the controller includes further instructions that when executed cause the controller to, responsive to the engine air-fuel ratio reaching stoichiometric air-fuel ratio and responsive to a temperature of the catalytic converter being more than a threshold temperature, position the first valve in a first position of the first valve and the second valve in a first position of the second valve to direct exhaust flow along the exhaust pipe through the catalytic converter to atmosphere. In any or all of the preceding examples, additionally or optionally, the controller includes further instructions that when executed cause the controller to, responsive to the temperature of the catalytic converter being more the threshold temperature and a pressure inside the tank more than a minimum pressure, position the first valve in a second position of the first valve and the second valve in the first position of the second valve to direct exhaust flow from the tank to the exhaust pipe through the catalytic converter to atmosphere, bypassing the tank. In any or all of the preceding examples, additionally or optionally, the controller includes further instructions that when executed cause the controller to, responsive to the temperature of the catalytic converter being below the threshold temperature, position the first valve in the first position of the first valve and the second valve in a second position of the second valve to direct exhaust flow along the exhaust pipe through the catalytic converter to the tank. In any or all of the preceding examples, additionally or optionally, the controller includes further instructions that when executed cause the controller to, responsive to an air fuel ratio of the engine being off-stoichiometry, position the first valve in the first position of the first valve and the second valve in the second position of the second valve to direct exhaust flow along the exhaust pipe through the catalytic converter to the tank. In any or all of the preceding examples, additionally or optionally, the controller includes further instructions that when executed cause the controller to, responsive to an air fuel ratio inside the tank being off-stoichiometry, position the first valve in the first position of the first valve and the second valve in the second position of the second valve to direct exhaust flow along the exhaust pipe through the catalytic converter to the tank. In any or all of the preceding examples, additionally or optionally, the controller includes further instructions that when executed cause the controller to, responsive to the air fuel ratio inside the tank deviating from stoichiometry, adjust the air fuel ratio of the engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an exhaust system of an engine, comprising:
    operating with, and determining that, an engine air-fuel ratio deviates from a threshold air-fuel ratio;
    directing a flow of exhaust gas from downstream of a catalytic converter to a tank in response to determining the engine air-fuel ratio deviates from the threshold air-fuel ratio;
    operating without the engine air-fuel ratio deviating from the threshold air-fuel ratio and determining said operation;
    adjusting an air-fuel ratio of the exhaust gas in the tank;
    releasing the exhaust gas from the tank to upstream of the catalytic converter, the released exhaust gas adjusted to the threshold air-fuel ratio; and
    not directing the flow of exhaust gas from downstream of the catalytic converter to the tank in response to determining operation without the engine air-fuel ratio deviating from the threshold air-fuel ratio.

2. The method of claim 1, wherein the threshold air-fuel ratio comprises a stoichiometric air-fuel ratio.

3. The method of claim 1, wherein a temperature of the catalytic converter is more than a threshold temperature while directing the flow of exhaust gas from downstream of the catalytic converter to the tank, and wherein only exhaust gas that has passed through the engine is stored in the tank, wherein the threshold temperature is a light-off temperature of the catalytic converter.

4. The method of claim 3, further comprising operating with the temperature of the catalytic converter being more than the threshold temperature and operating with the temperature of the catalytic converter being less than the threshold temperature and determining said temperature, and directing the flow of exhaust gas from downstream of the catalytic converter to the tank responsive to the temperature of the catalytic converter being less than the threshold temperature, wherein the threshold temperature is the light-off temperature of the catalytic converter.

5. The method of claim 1, further comprising operating with a pressure inside the tank more than a minimum pressure and operating with the pressure less than the minimum pressure and determining said pressure, and operating with a temperature of the catalytic converter being more than a threshold temperature and operating with the temperature of the catalytic converter being less than the threshold temperature and determining said temperature, wherein releasing the exhaust gas from the tank comprises directing the exhaust gas from the tank to upstream of the catalytic converter in response to the pressure inside the tank determined to be more than the minimum pressure and the temperature of the catalytic converter determined to be more than the threshold temperature, wherein the threshold temperature is a light-off temperature of the catalytic converter.

6. The method of claim 1, wherein directing the flow of exhaust gas from downstream of the catalytic converter to the tank includes:
adjusting a position of a first valve upstream of the catalytic converter to a first position of the first valve, thereby establishing fluidic communication between the engine and an inlet of the catalytic converter; and
adjusting a position of a second valve downstream of the catalytic converter to a second position of the second valve, thereby establishing fluidic communication between an outlet of the catalytic converter and the tank.

7. The method of claim 6, wherein releasing the exhaust gas from the tank includes:
adjusting the position of the first valve to a second position of the first valve, thereby establishing fluidic communication between the tank and the inlet of the catalytic converter; and
adjusting the position of the second valve to a first position of the second valve, thereby blocking the fluidic communication between the outlet of the catalytic converter and the tank.

8. The method of claim 6, further comprising directing the flow of exhaust gas from downstream of the catalytic converter to the tank in response to a degraded oxygen sensor upstream of the second valve.

9. A method for operating an exhaust system, comprising:
operating with, and determining, a degraded oxygen sensor; and
responsive to determining the degraded oxygen sensor's condition, directing exhaust flow through a catalytic converter to a tank of the exhaust system and controlling an amount of the exhaust flow directed back to the catalytic converter by regulating a position of a first valve coupled between the tank and upstream of the catalytic converter, wherein the degraded oxygen sensor is positioned upstream of the first valve, the method further comprising operating an engine in a low engine load and deactivating one or more cylinders of the engine such that one set of engine cylinders has a different air-fuel ratio than another set of engine cylinders while directing exhaust from downstream of the catalytic converter to flow to the tank, including mixing lean exhaust with rich exhaust already stored in the tank.

10. The method of claim 9, further comprising:
operating with, and determining that, an air-fuel ratio of exhaust in the tank is not at a stoichiometric air-fuel ratio;
operating without the air-fuel ratio at stoichiometric; and
responsive to the air-fuel ratio of exhaust in the tank being stoichiometric, operating the exhaust system in an exhaust release mode by directing exhaust from the tank through the first valve into the catalytic converter and from the catalytic converter to atmosphere, bypassing the tank, the exhaust from the catalytic converter to atmosphere controlled via a second valve downstream of the catalytic converter.

11. The method of claim 10, wherein, during the exhaust release mode, a temperature of the catalytic converter is above a threshold temperature.

12. The method of claim 10, wherein, during the exhaust release mode, a pressure inside the tank is more than a minimum pressure of the tank and is less than or equal to a maximum pressure of the tank, the maximum pressure of the tank being greater than the minimum pressure of the tank, the method further comprising operating the engine with the pressure inside the tank less than the maximum pressure.

13. A system comprising:
an exhaust pipe configured to flow exhaust from an engine to atmosphere via a catalytic converter;
a tank coupled to the exhaust pipe through each of a first valve and a second valve; and
a controller storing non-transitory instructions in memory that, when executed, cause the controller to adjust a position of the first valve and a position of the second valve to store exhaust from downstream of the catalytic converter in the tank responsive to an engine air-fuel ratio deviating from a stoichiometric air-fuel ratio; and
further instructions that, when executed, cause the controller to, responsive to a degraded oxygen sensor, direct exhaust flow through the catalytic converter to the tank and control an amount of the exhaust flow directed back to the catalytic converter by regulating the position of the first valve based on severity of degradation of the degraded oxygen sensor, where the controller employs engine actuators to adjust positions of each of the first valve and the second valve, respectively.

14. The system of claim 13, wherein the controller includes further instructions that, when executed, cause the controller to, responsive to the engine air-fuel ratio reaching the stoichiometric air-fuel ratio and responsive to a temperature of the catalytic converter being more than a threshold temperature, position the first valve in a first position of the first valve and the second valve in a first position of the second valve to direct exhaust flow along the exhaust pipe through the catalytic converter to atmosphere.

15. The system of claim 14, wherein the controller includes further instructions that, when executed, cause the controller to, responsive to the temperature of the catalytic converter being more the threshold temperature and a pressure inside the tank more than a minimum pressure, position the first valve in a second position of the first valve and the second valve in the first position of the second valve to direct exhaust flow from the tank to the exhaust pipe through the catalytic converter to atmosphere.

16. The system of claim 14, wherein the controller includes further instructions that, when executed, cause the controller to, responsive to the temperature of the catalytic converter being below the threshold temperature, position the first valve in the first position of the first valve and the second valve in a second position of the second valve to direct exhaust flow along the exhaust pipe through the catalytic converter to the tank, the tank coupled to a compressor.

17. The system of claim 16, wherein to adjust the position of the first valve and the position of the second valve to store exhaust from downstream of the catalytic converter in the tank responsive to the engine air-fuel ratio deviating from the stoichiometric air-fuel ratio, the controller includes further instructions that, when executed, cause the controller to position the first valve in the first position of the first valve and position the second valve in the second position of the second valve.

18. The system of claim 17, wherein the controller includes further instructions that, when executed, cause the controller to, responsive to an air-fuel ratio inside the tank deviating from the stoichiometric air-fuel ratio, position the first valve in the first position of the first valve and the second valve in the second position of the second valve to direct exhaust flow along the exhaust pipe through the catalytic converter to the tank.

19. The system of claim 18, wherein the controller includes further instructions that, when executed, cause the controller to, responsive to the air-fuel ratio inside the tank deviating from the stoichiometric air-fuel ratio, adjust the engine air-fuel ratio.

* * * * *